United States Patent
Burkhart-Day et al.

(10) Patent No.: US 10,905,203 B2
(45) Date of Patent: Feb. 2, 2021

(54) REUSABLE CLOSURE SYSTEM

(71) Applicant: Re-U-Zip, LLC, Santa Monica, CA (US)

(72) Inventors: Eric Edgar Burkhart-Day, Arcadia, CA (US); Navaratan Kanna Sunkara, Arcadia, CA (US); Sivaketan Ramu Sunkara, Arcadia, CA (US)

(73) Assignee: Re-U-Zip, LLC, Santa Monica, CA (US)

( * ) Notice: Subject to any disclaimer, the term of this patent is extended or adjusted under 35 U.S.C. 154(b) by 0 days.

(21) Appl. No.: 16/296,721

(22) Filed: Mar. 8, 2019

(65) Prior Publication Data

US 2020/0281329 A1    Sep. 10, 2020

(51) Int. Cl.
*A44B 18/00* (2006.01)
*A44B 19/34* (2006.01)
*F16B 1/00* (2006.01)

(52) U.S. Cl.
CPC .......... *A44B 18/0003* (2013.01); *A44B 19/34* (2013.01); *F16B 1/00* (2013.01); *F16B 2001/0035* (2013.01)

(58) Field of Classification Search
CPC ............................ Y10T 24/32; A44B 18/0003
See application file for complete search history.

(56) References Cited

U.S. PATENT DOCUMENTS

| | | | |
|---|---|---|---|
| 2,768,922 A | 10/1956 | Klein | |
| 3,456,305 A | 7/1969 | Voit | |
| 3,538,914 A | 11/1970 | Myers | |
| 3,685,103 A | 8/1972 | Severino | |
| 3,696,472 A | 10/1972 | Perina | |
| 3,785,014 A | 1/1974 | Canepa | |
| 3,827,019 A * | 7/1974 | Serbu | A41F 1/002 335/285 |
| 3,883,381 A | 5/1975 | Thaeler | |
| 3,925,858 A | 12/1975 | Thaeler | |
| 4,083,582 A | 4/1978 | Villafana | |

(Continued)

FOREIGN PATENT DOCUMENTS

KR    20180130114 A    12/2018

OTHER PUBLICATIONS https://youtu.be/oF8v_uch3Ls; ZipWall Dust Barrier System—ZipWall MagStrips Installation YouTube Video Webpage; Jul. 31, 2018.

(Continued)

*Primary Examiner* — Robert Sandy
*Assistant Examiner* — Michael S Lee
(74) *Attorney, Agent, or Firm* — Neustel Law Offices

(57) ABSTRACT

A reusable closure system for providing easy closure and opening of an object such as a sheet forming a barrier. The reusable closure system generally includes a backing member adapted to be secured to an object, such as by an adhesive. A closure member may be connected to the backing member, with the closure member including a first portion which is removably connected to a second portion by one or more magnets. An optional outer closure member may be connected to the closure member, with the outer closure member including a zipper. Thus, the reusable closure system may be secured to various objects to allow for selective opening or closing of the objects in a versatile, user-selected manner.

14 Claims, 20 Drawing Sheets

(56) References Cited

U.S. PATENT DOCUMENTS

| | | | |
|---|---|---|---|
| 4,137,859 A | 2/1979 | Itoh | |
| 5,067,207 A | 11/1991 | Semons | |
| 5,148,580 A * | 9/1992 | Dyckow | A47K 3/38 160/349.2 |
| 5,311,648 A | 5/1994 | Semons | |
| 5,368,085 A | 11/1994 | Ruparelia | |
| 5,427,169 A | 6/1995 | Saulters | |
| 5,476,323 A * | 12/1995 | Gold | B65D 33/18 229/80.5 |
| 5,604,960 A | 2/1997 | Good | |
| 5,819,474 A | 10/1998 | Strom | |
| 6,301,754 B1 * | 10/2001 | Grunberger | A41F 1/002 24/303 |
| 8,578,570 B1 * | 11/2013 | Dwight | A45C 3/00 24/303 |
| 8,662,298 B2 * | 3/2014 | Aldana | A45C 11/00 206/320 |
| 9,387,921 B1 * | 7/2016 | Hogsette, Jr. | B64C 1/1461 |
| 9,966,174 B2 * | 5/2018 | Naftali | A45C 13/1069 |
| 2005/0183247 A1 | 8/2005 | Berns | |
| 2006/0139134 A1 * | 6/2006 | Hunts | H01F 7/0242 335/205 |
| 2008/0040837 A1 | 2/2008 | King | |
| 2009/0100648 A1 | 4/2009 | Naftalin | |
| 2010/0107528 A1 | 5/2010 | Toledo | |
| 2010/0269312 A1 | 10/2010 | Wagner | |
| 2011/0068025 A1 | 3/2011 | Whittemore | |
| 2012/0234705 A1 * | 9/2012 | Whittemore | E04G 21/241 206/225 |
| 2013/0061431 A1 * | 3/2013 | Naftali | A45C 13/1069 24/303 |
| 2015/0216267 A1 | 8/2015 | Burkhart-Day | |
| 2017/0181506 A1 | 6/2017 | Burkhart-Day | |

OTHER PUBLICATIONS https://www.zipwall.com/product/magstrip-dust-barrier-fastener/#video; ZipWall MagStrip Dust Barrier Fastener Webpage.
https://www.zipwall.com/product/zipwall-magnetic-dust-barrier-door/; ZipWall Magnetic Dust Barrier Door Kit Webpage.
https://www.youtube.com/watch?v=1pNK2PRa5g4; ProtecUK1 YouTube Video Webpage—How to Install the Zip Door Kit; May 22, 2015.
PCT International Search Report and Written Opinion for PCT/US2020/020614; dated Jun. 10, 2020.

* cited by examiner

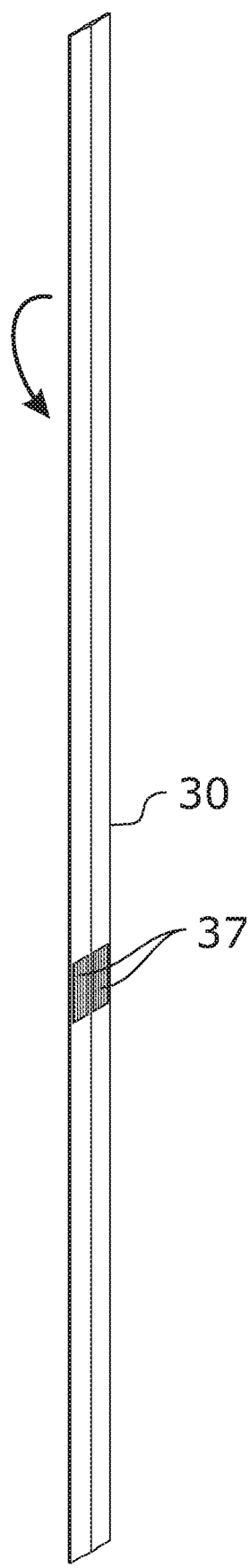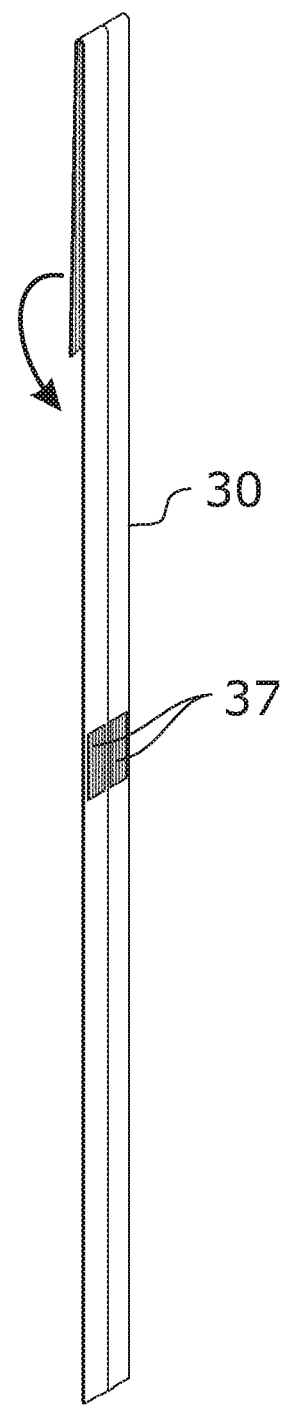

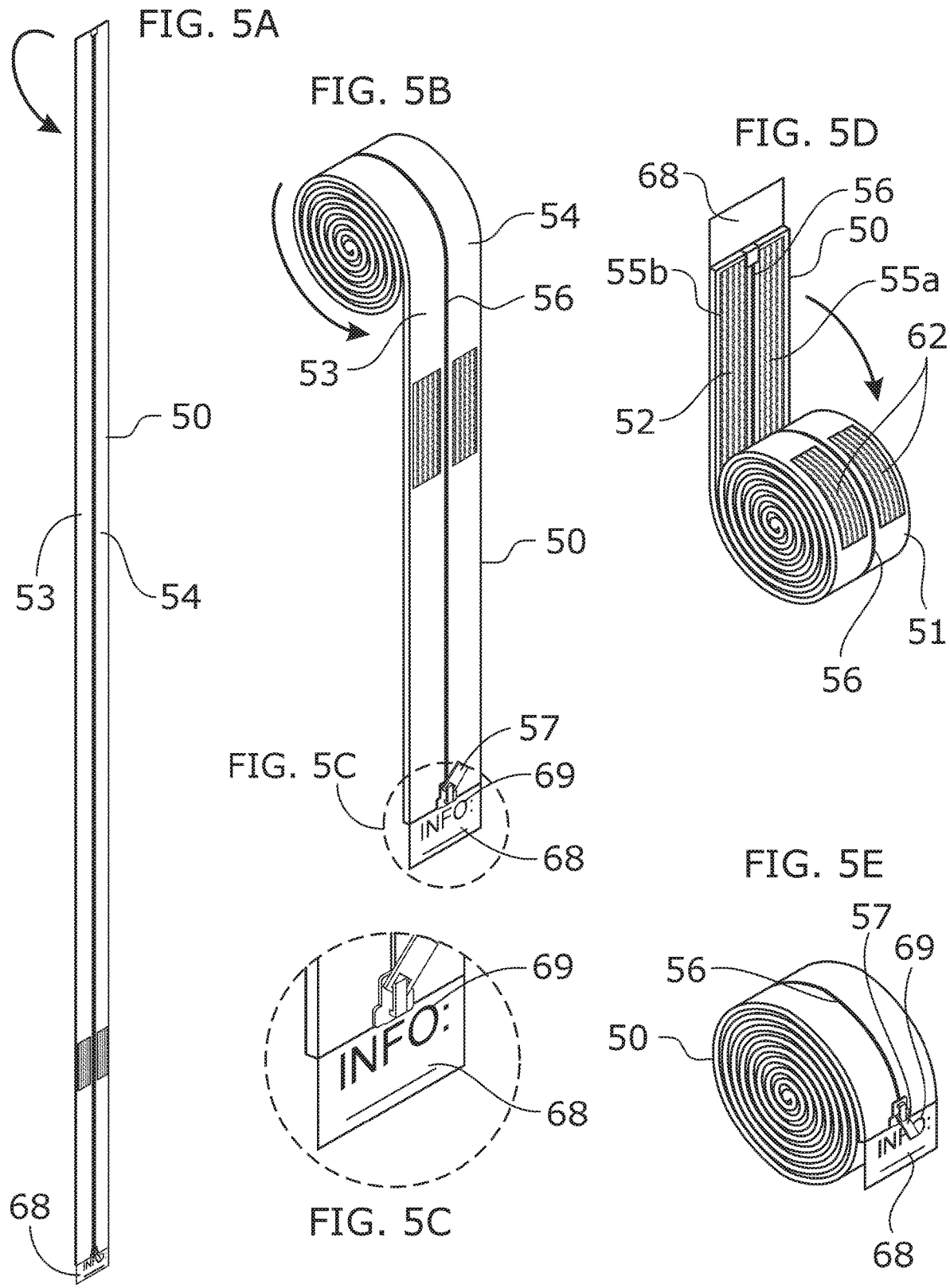

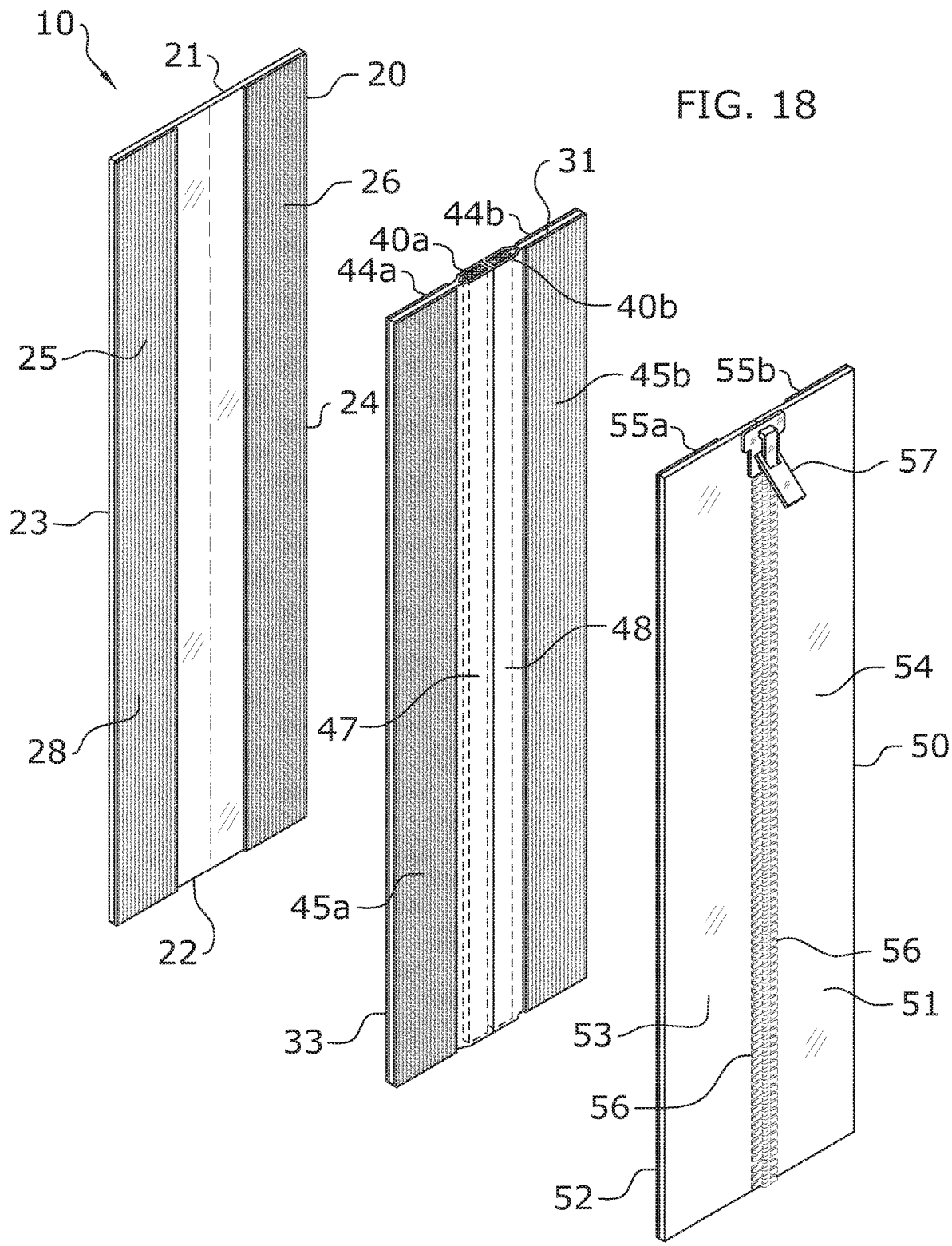

REUSABLE CLOSURE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a reusable closure system for providing easy closure and opening of an object such as a sheet forming a barrier.

Related Art

Any discussion of the related art throughout the specification should in no way be considered as an admission that such related art is widely known or forms part of common general knowledge in the field.

Closure systems are generally permanently attached to various objects, such as objects surrounding openings meant to be selectively opened and/or closed. Other types of objects with such openings may omit closure systems entirely. This can result in security issues, environmental risks due to particulates travelling through a barrier, or the like.

While closure systems which are permanently attached to objects such as doorways, tents, barriers, greenhouses, boat covers, clothing, shoes, bags, doorways, sheets, tarps, and the like have been useful, they provide little to no versatility. Further, they must be installed on the manufacturer's side. It would be preferable for a reusable closure system to be provided to be removably connected to an object by a user, which allows for versatility not permitted with fixed closure systems such as fixed zippers or the like.

It is also common for closure systems to be integrated, such as by fixable attachment, to the object. In such situations, damage to the closure system will necessarily require replacement of the entire object. It would be much more preferable if the closure system could be easily removed from the object and the closure system replaced if damaged, thus negating the need to replace the object itself.

SUMMARY

An example embodiment is directed to a reusable closure system. The reusable closure system includes a backing member adapted to be secured to an object, such as by an adhesive. A closure member may be connected to the backing member, with the closure member including a first portion which is removably connected to a second portion by one or more magnets. An optional outer closure member may be connected to the closure member, with the outer closure member including a zipper. Thus, the reusable closure system may be secured to various objects such as tents, greenhouses, or the like to allow for selective opening or closing of the objects in a versatile, user-selected manner. The reusable closure system may also be removable from the object such that damage to the reusable closure system does not necessitate replacement of the object itself.

There has thus been outlined, rather broadly, some of the embodiments of the reusable closure system in order that the detailed description thereof may be better understood, and in order that the present contribution to the art may be better appreciated. There are additional embodiments of the reusable closure system that will be described hereinafter and that will form the subject matter of the claims appended hereto. In this respect, before explaining at least one embodiment of the reusable closure system in detail, it is to be understood that the reusable closure system is not limited in its application to the details of construction or to the arrangements of the components set forth in the following description or illustrated in the drawings. The reusable closure system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 4A is a perspective view of a closure member of a reusable closure system in accordance with an example embodiment.

FIG. 4B is a perspective view of a partially-folded closure member of a reusable closure system in accordance with an example embodiment.

FIG. 5A is a perspective view of an outer closure member of a reusable closure system in accordance with an example embodiment.

FIG. 5B is a perspective view of a partially rolled-up outer closure member of a reusable closure system in accordance with an example embodiment.

FIG. 5C is a perspective view of a label on an outer closure member of a reusable closure system in accordance with an example embodiment.

FIG. 5D is a perspective view of a partially rolled-up outer closure member of a reusable closure system in accordance with an example embodiment.

FIG. 5E is a perspective view of a rolled-up outer closure member of a reusable closure system in accordance with an example embodiment.

FIG. 18 is a first perspective view of a reusable closure system in accordance with an example embodiment.

DETAILED DESCRIPTION

A. Overview

Figure 1:
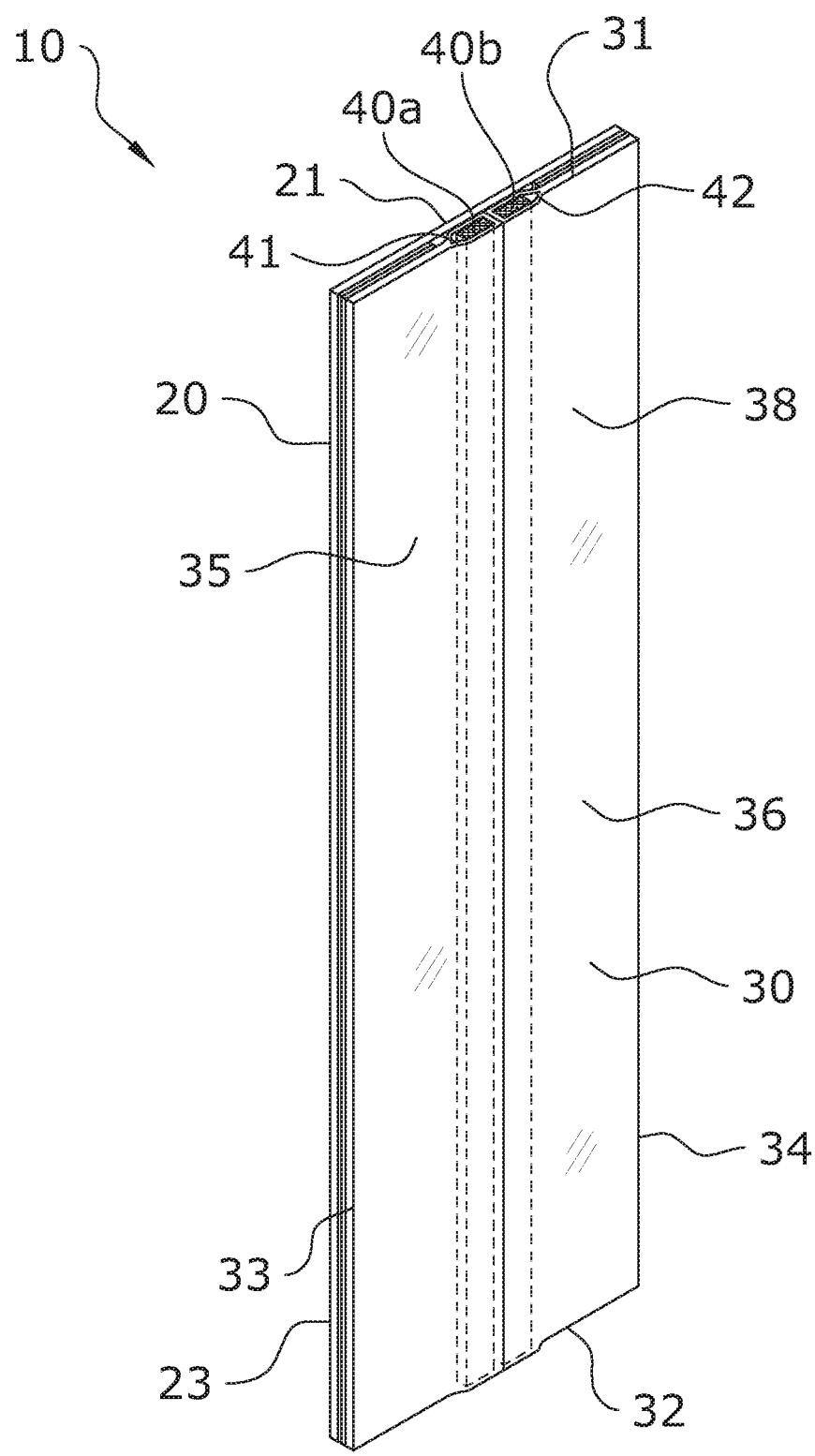
FIG. 1 is a perspective view of a reusable closure system in accordance with an example embodiment.

An example reusable closure system 10 generally comprises a backing member 20 adapted to be secured to an object such as a sheet 13. A closure member 30 may be removably connected to the backing member 20, the closure member 30 comprising a first portion 35 and a second portion 36. A first magnet 40a may connect the first portion 35 and the second portion 36 of the closure member 30. An adhesive 27 on an inner surface 29 of the backing member 20 may be provided for securing the backing member 20 to the object.

The first magnet 40a may be connected to the first portion 35 of the closure member 30. A second magnet 40b may be connected to the second portion 36 of the closure member 30, with the second magnet 40b being removably connected to the first magnet 40a. The first portion 35 of the closure member 30 may comprise a first pocket 41 and the second portion 36 of the closure member 30 may comprise a second pocket 42, with the first magnet 40a being positioned within the first pocket 41 and the second magnet 40b being positioned within the second pocket 42.

An outer closure member 50 may be removably or fixedly connected to the closure member 30. The outer closure member 50 may comprise a zipper 57, with an outer surface 51 of the closure member 30 comprising outer connectors 45a, 45b for engaging with an inner surface 52 of the outer closure member 50. The inner surface 52 of the outer closure member 50 may comprise a connector strip 55a, 55b for engaging with the outer connectors 45a, 45b of the outer surface 38 of the closure member 30. The outer closure member 50 may comprise an opening such as a grommet 60, with a locking device 61 such as a padlock being adapted to be removably connected between the zipper 57 and the opening (grommet 60) of the outer closure member 50.

Another exemplary embodiment of a reusable closure system 10 may comprise a backing member 20 adapted to be secured to an object such as a sheet 13. A closure member 30 may be removably connected to the backing member 20, with the closure member 30 comprising a first portion 35 and a second portion 36. A first magnet 40a may be positioned on the first portion 35 of the closure member 30 and a second magnet 40b may be positioned on the second portion 36 of the closure member 30 such that the first portion 35 of the closure member 30 is removably connected to the second portion 36 of the closure member 30 by the first magnet 40a and the second magnet 40b. The inner surface 29 of the backing member 20 may comprise an adhesive 27 for securing the backing member 20 to an object. The first portion 35 of the closure member 30 may comprise a first pocket 41, with the first magnet 40a being positioned within the first pocket 41 of the first portion 35 of the closure member 20. The second portion 36 of the closure member 30 may comprise a second pocket 42, with the second magnet 40b being positioned within the second pocket 42 of the second portion 36 of the closure member 30.

An outer closure member 50 may be removably or fixedly connected to the closure member 30. The outer closure member 50 may comprise a first portion 53 and a second portion 54, with the first portion 53 of the outer closure member 50 being connected to the second portion 54 of the outer closure member 50. A zipper 57 may connect the first portion 53 of the outer closure member 50 to the second portion 54 of the outer closure member 50. A grommet 60 may be positioned near the zipper 57 of the outer closure member 50 and a locking device 61 may be adapted to be removably connected between the zipper 57 and the grommet 60 of the outer closure member 50 for selectively locking the zipper 57 of the outer closure member 50.

B. Backing Member

Figure 2:
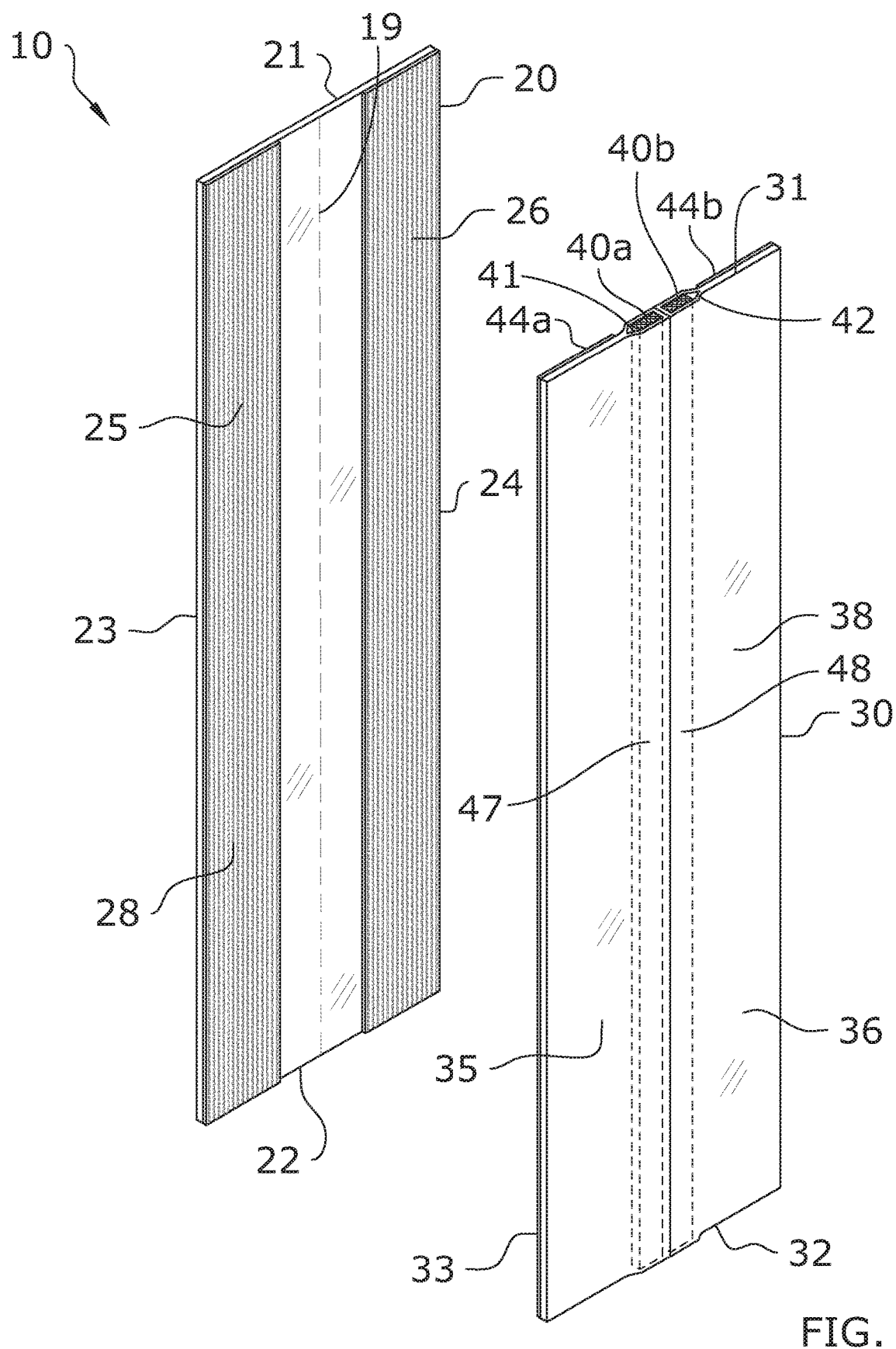
FIG. 2 is a front perspective view of a reusable closure system illustrating both the backing member and closure member in accordance with an example embodiment.
Figure 3:
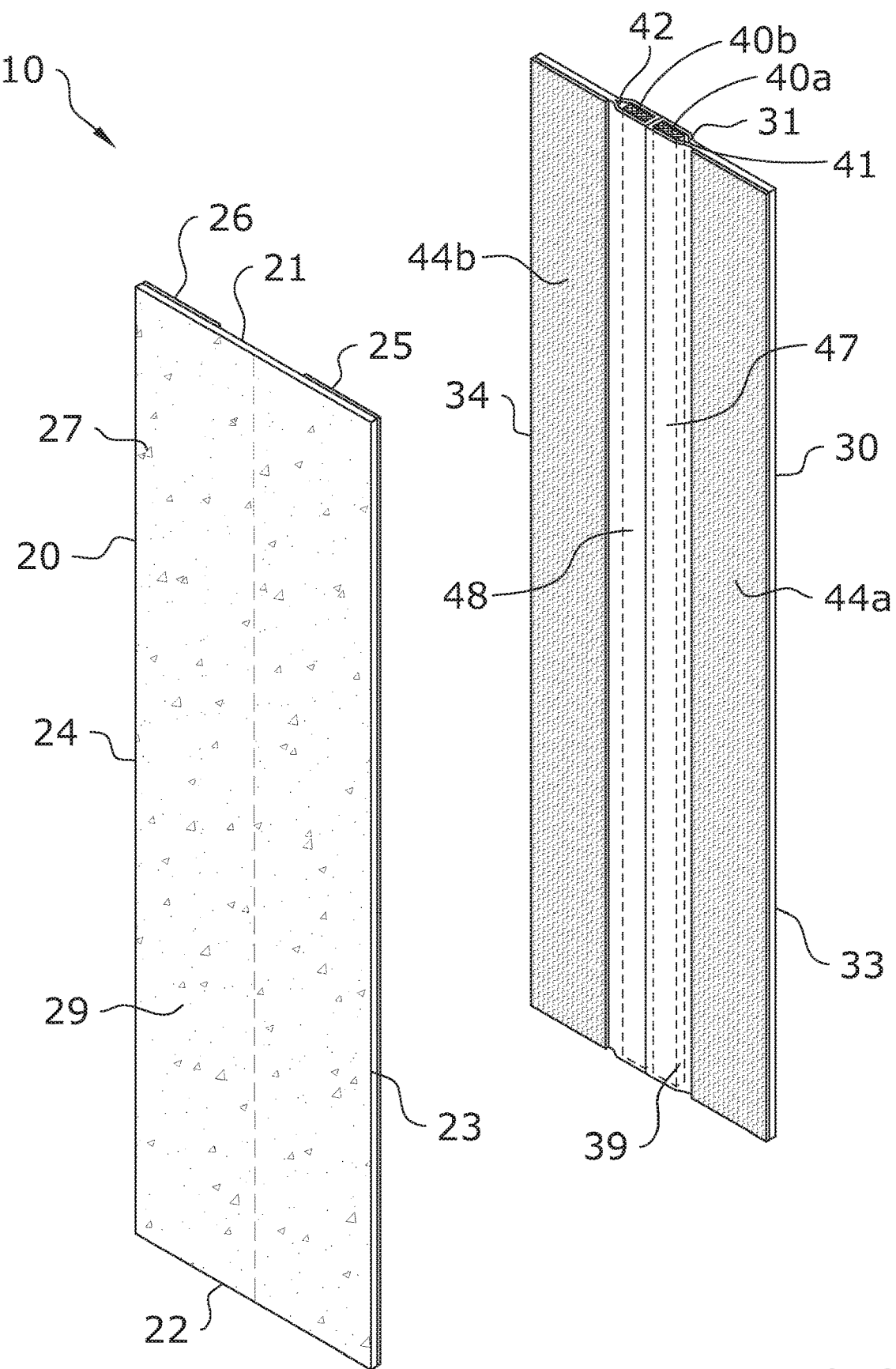
FIG. 3 is a rear perspective view of a reusable closure system illustrating both the backing member and closure member in accordance with an example embodiment.

As best shown in FIGS. 2 and 3, an exemplary embodiment of a reusable closure system 10 may comprise a backing member 20 adapted to be secured to an object such as a sheet 13. As shown in FIGS. 2 and 3, the backing member 20 may comprise an upper end 21, a lower end 22, a first side 23, a second side 24, an outer surface 28, and an inner surface 29. In the exemplary figures, the backing member 20 is illustrated as comprising an elongated rectangular strip.

The shape, size, and dimensions of the backing member 20 may vary in different embodiments. Thus, the backing member 20 should not be construed as comprising a rectangular shape as shown in the exemplary figures, nor should it be construed to be the particular width and/or length shown in the exemplary figures. As shown in FIG. 6A-6D, the backing member 20 may be rolled up prior to use for easy storage or transport.

The backing member 20 may comprise an adhesive 27 or other type of fastener on its inner surface 29 such as shown in FIG. 3. The adhesive 27 or other fastener may be utilized to removably connect the backing member 20 to the object for which a reusable closure system 10 is needed. While the figures illustrate usage of an adhesive 27 such as glue, it should be appreciated that the inner surface 29 of the backing member 20 may alternatively comprise a fastener such as hook-and-loop fastener. In other embodiments, tape or the like may be utilized to secure the backing member 20 to the object.

As best shown in FIG. 2, the outer surface 28 of the backing member 20 may comprise one or more connectors 25, 26 for removably connecting a closure member 30 to the backing member 20. In the exemplary embodiment shown in FIG. 2, a first connector 25 and a second connector 26, each comprising a strip of a fastening material such as a hook-and-loop fastener, is shown used.

Continuing to reference FIGS. 2 and 3, it can be seen that a strip of first connector 25 extends between the upper and lower ends 21, 22 of the outer surface 28 of the backing member 20 near its first side 23 and a strip of second connector 26 extends in parallel orientation with respect to the first connector 25 near the second side 24 of the outer surface 28 of the backing member 20. In the exemplary embodiment shown in FIG. 6A, a single connector 25 comprising a single strip of hook-and-loop fastener which covers the outer surface 28 of the backing member 20 is shown.

It should be appreciated that the number and orientation of connectors 25, 26 used on the backing member 20 may vary in different embodiments. For example, only portions of the outer surface 28 backing member 20 may utilize the connectors 25, 26. In other embodiments, the entire outer surface 28 may be connected with the connectors 25, 26. In the embodiment shown in FIG. 2, two discrete strips of connectors 25, 26 are shown, with a centerline 19 being visible between the two strips of connectors 25, 26 to act as a cutting guide.

The type of connectors 25, 26 used may vary in different embodiments. In the exemplary embodiment shown in the figures, hook-and-loop fastener strips are shown. In another exemplary embodiment, an adhesive may be utilized. Alternatively, tape or the like could be utilized as the connectors 25, 26. It is preferable that the connectors 25, 26 are adapted to engage with the inner surface 39 of the closure member 30 so as to secure the closure member 30 to the backing member 20 such as shown in FIG. 1.

Figure 6A:
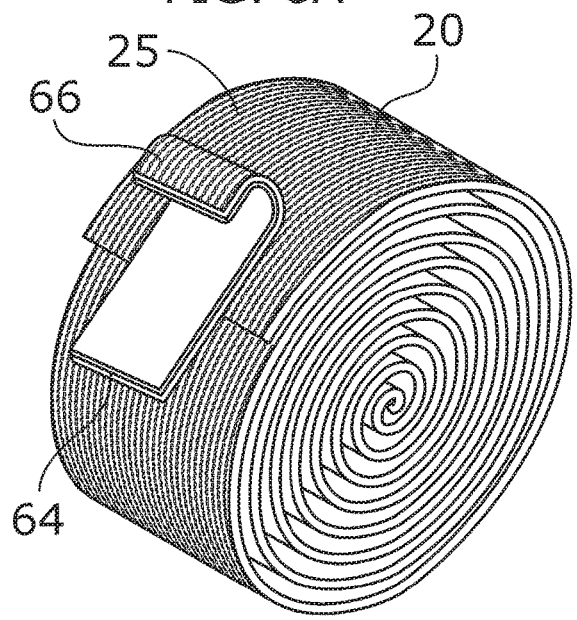
FIG. 6A is a perspective view of a rolled-up backing member of a reusable closure system in accordance with an example embodiment.
Figure 6B:
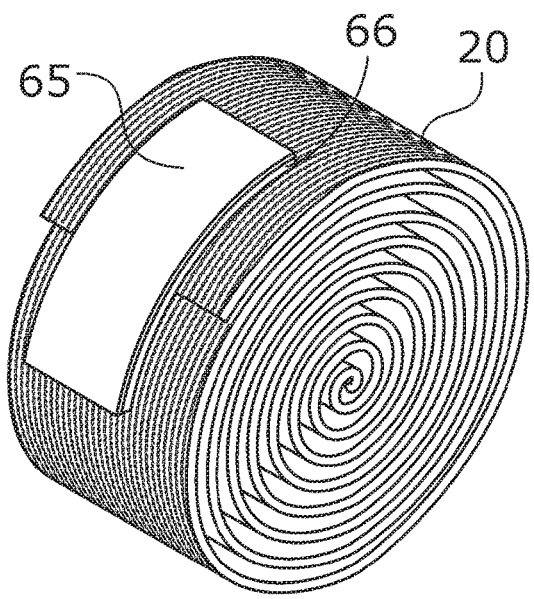
FIG. 6B is a perspective view of a rolled-up backing member of a reusable closure system in accordance with an example embodiment.
Figure 6C:
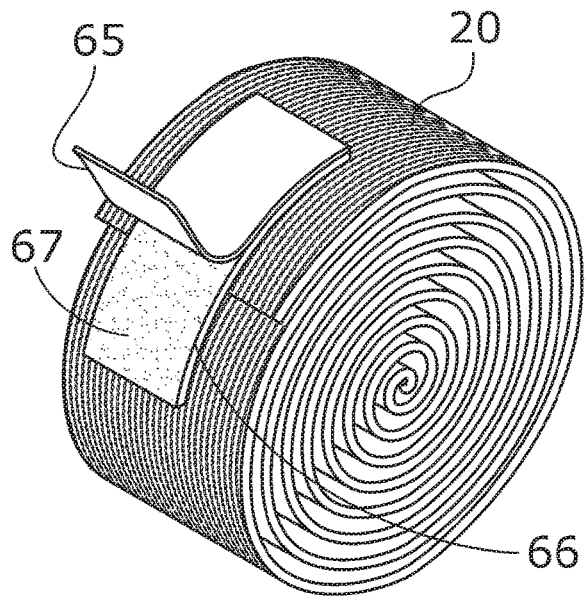
FIG. 6C is a perspective view illustrating removal of a backing strip from a mount of a backing member of a reusable closure system in accordance with an example embodiment.
Figure 6D:
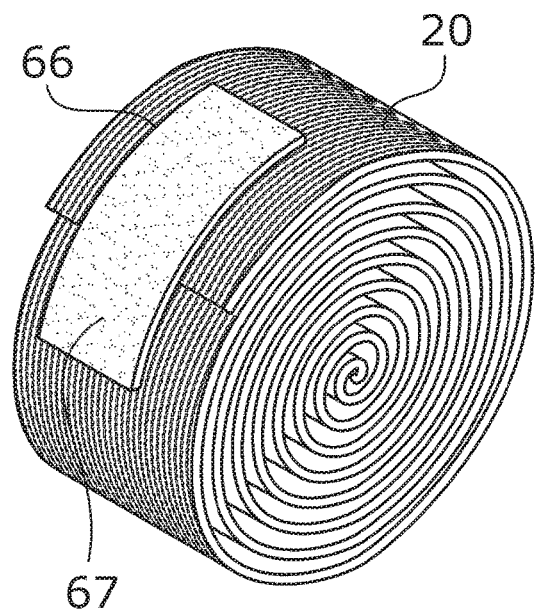
FIG. 6D is a perspective view of a backing member and mount of a reusable closure system in accordance with an example embodiment.
Figure 14:
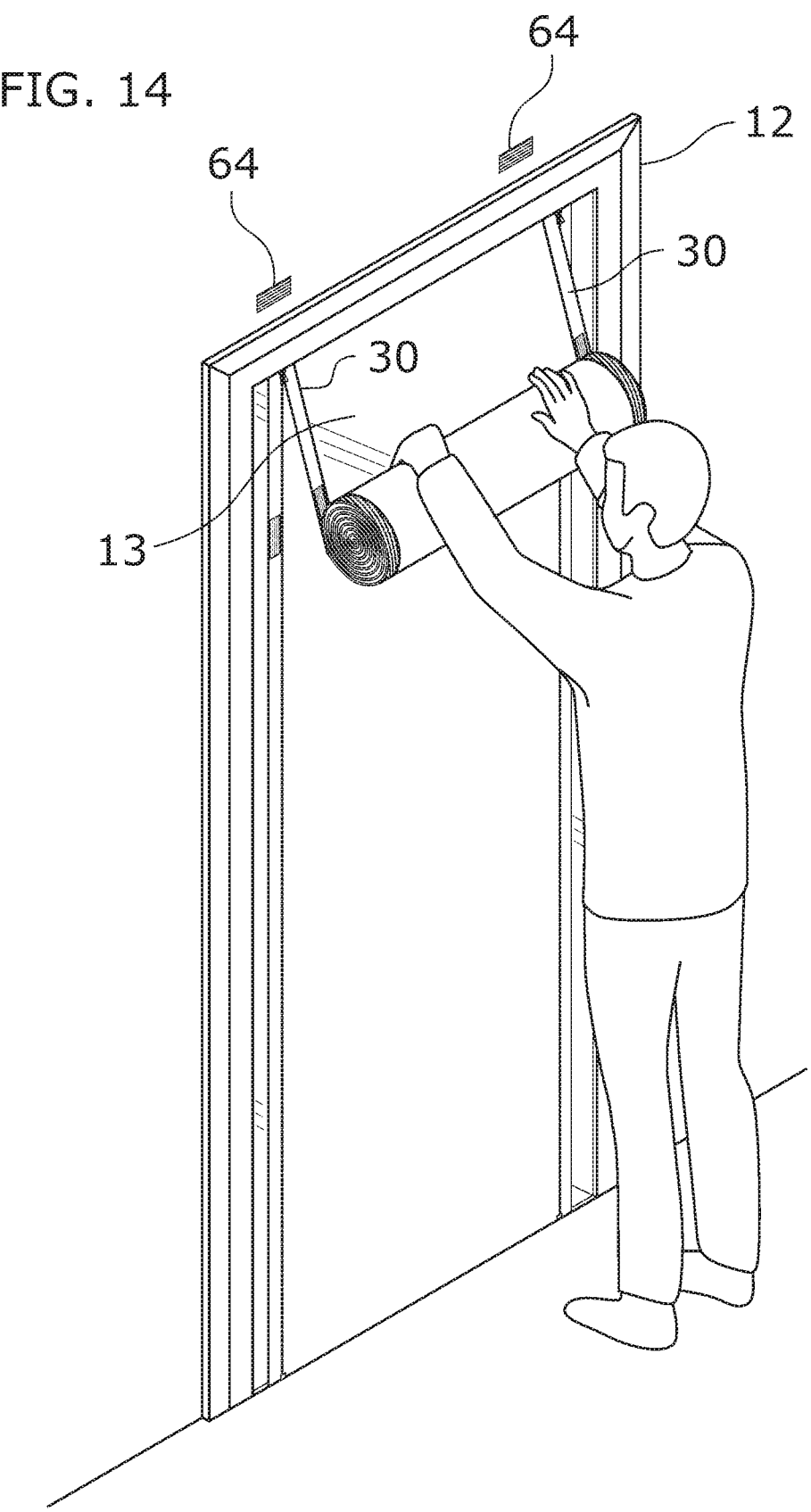
FIG. 14 is a perspective view of a barrier being rolled up of a reusable closure system in accordance with an example embodiment.

As shown in FIGS. 6A-6D, the backing member 20 may be rolled up to allow for easier storage or transport. A mount 64 may be utilized to secure the backing member 20 in its rolled up configuration such as shown in FIG. 6A. The mount 64 may also serve the dual purpose of acting as a mount point to secure the sheet 13 in an upright position such as shown in FIG. 14.

The mount 64 may include a connector 66 such as hook-and-loop fastener which is adapted to engage with the connectors 25, 26 of the backing member 20. The mount 64 may also include an adhesive 67 on its inner end which may be utilized to secure the mount 64 to a wall, sheet 13, or the like such as shown in FIG. 14 and discussed herein. A backing strip 65 may be positioned over the adhesive 67 prior to its use.

C. Closure Member

As best shown in FIGS. 1-4E, an exemplary embodiment of a reusable closure system 10 may comprise a closure member 30 which is removably or fixedly connected to the backing member 20. The closure member 30 may comprise an elongated strip, though it should be appreciated that the shape, size, configuration, and orientation of the closure member 30 may vary in different embodiments.

In the exemplary embodiment best shown in FIGS. 1-3, the closure member 30 is illustrated as comprising an elongated configuration having an upper end 31, a lower end 32, a first side 33, and a second side 34. The closure member 30 may comprise inner connectors 44a, 44b on its inner surface 39. The inner surface 39 of the closure member 30 may be removably connected to the backing member 20 such as shown in FIG. 1. The outer surface 28 of the backing member 20 may include magnets 40a, 40b as discussed herein.

The inner connectors 44a, 44b on the inner surface 39 of the closure member 30 may be utilized for securing the closure member 30 to the backing member 20. Thus, the inner connectors 44a, 44b may be positioned on the inner surface 39 of the closure member 30 as shown in FIG. 3. In such an embodiment, the inner connectors 44a, 44b are shown as extending along the first and second sides 33, 34 of the inner surface 39 of the closure member 30 between its upper and lower ends 31, 32.

In the exemplary embodiment shown in FIG. 3, a first inner connector 44a extends between the upper and lower ends 31, 32 of the inner surface 39 of the closure member 30 near its first side 33 and the second inner connector 44b extends in parallel orientation with respect to the first inner connector 44a near the second side 34 of the inner surface 39 of the closure member 30. It should be appreciated that the inner connectors 44a, 44b may be comprised of different shapes, sizes, configuration, and orientations than shown in the figures.

The inner connectors 44a, 44b may comprise hook-and-loop fasteners. However, it should be appreciated that the inner connectors 44a, 44b may in alternate embodiments comprise other structures or substances to connect the backing and closure members 20, 30 together. For example, the inner connectors 44a, 44b may in some embodiments comprise an adhesive, clasps, buttons, or the like.

The closure member 30 may comprise a first portion 35 and a second portion 36, with the first portion 35 including the first side 33 of the closure member 30 and the second portion 36 including the second side 34 of the closure member 30. The first and second portions 35, 36 of the closure member 30 may be removably connected, such as using magnets 40a, 40b. In the exemplary embodiment shown in FIGS. 1-3, the first portion 35 of the closure member 30 includes a first magnet 40a and the second portion 36 of the closure member 30 includes a second magnet 40b.

In the exemplary embodiment shown in FIGS. 1-3, the closure member 30 is illustrated as comprising a first connector portion 47 and a second connector portion 48, with the first connector portion 47 being removably connected to the second connector portion 48 to selectively open or close the closure member 30. The first connector portion 47 is illustrated as comprising the edge of the first portion 35 of the closure member 30 and the second connector portion 48 is illustrated as comprising the edge of the second portion 36 of the closure member 30.

As shown in FIGS. 1-3, the first magnet 40a may be connected to the first connector portion 47 and the second magnet 40b may be connected to the second connector portion 48. The manner in which the magnets 40a, 40b are secured to the closure member 30 may vary in different embodiments. In the exemplary embodiment shown in FIG. 1, the first portion 35 of the closure member 30 includes a first pocket 41 which extends the length of the closure member 30 between its upper and lower ends 31, 32. Similarly, the second portion 36 of the closure member 30 includes a second pocket 42 which extends along the length of the closure member 30 between its upper and lower ends 31, 32.

The first magnet 40a may be positioned within the first pocket 41 and the second magnet 40b may be positioned within the second pocket 42 such as shown in FIG. 1. The magnets 40a, 40b may in some embodiments be removably connected within the pockets 41, 42. In other embodiments, the pockets 41, 42 may be sealed such that the magnets 40a, 40b are not removable. In other embodiments, the pockets 41, 42 may be omitted entirely, with the magnets 40a, 40b being external to the closure member 30. For example, the magnets 40a, 40b could be fastened to the closure member 30 via use of adhesives, fasteners, clamps, sewn string (such as loops), or the like.

Figure 4C:
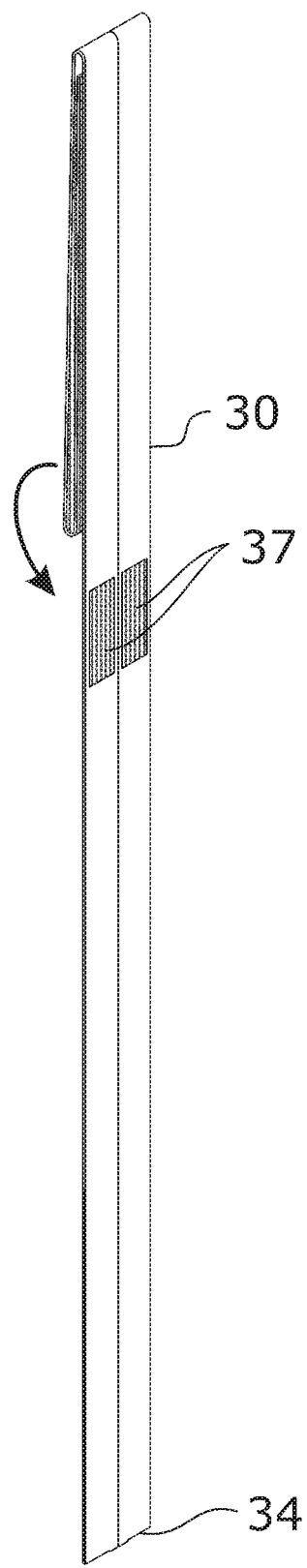
FIG. 4C is a perspective view of a partially-folded closure member of a reusable closure system in accordance with an example embodiment.
Figure 4D:
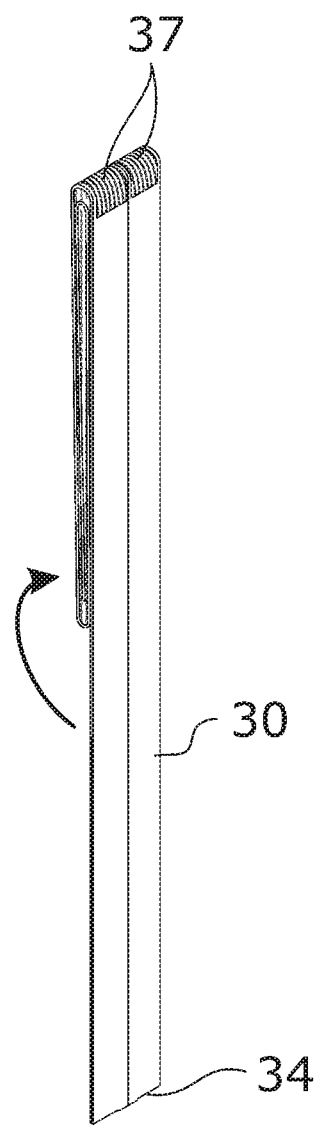
FIG. 4D is a perspective view of a partially-folded closure member of a reusable closure system in accordance with an example embodiment.
Figure 4E:
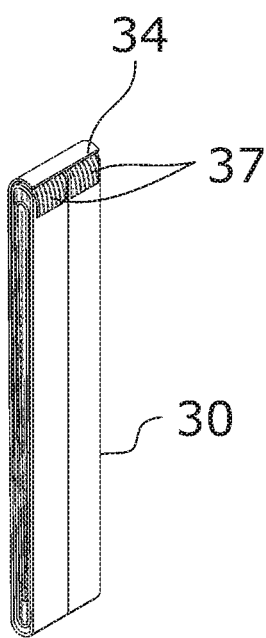
FIG. 4E is a perspective view of a folded closure member of a reusable closure system in accordance with an example embodiment.

The closure member 30 may in some embodiments be foldable such as shown in FIGS. 4A-4E. Such a configuration allows the closure member 30 to be easily collapsed to reduce its size for storage or transport. In such embodiments, the magnets 40a, 40b may be flexible or segmented such that the closure member 30 may be folded against itself such as shown in FIG. 4E.

The closure member 30 may include couplers 37 on its outer surface 38 which aid with securing the closure member 30 into a folded, collapsed state such as shown in FIG. 4E. The couplers 37 may comprise tabs, strips, or the like of a fastener material such as hook-and-loop fastener. The closure member 30 may be folded over itself and then secured in its collapsed state by wrapping a portion of the lower end 32 of the closure member 30 around the folded closure member 30 such that the inner connector strips 44a, 44b of the closure member 30 may removably engage with the couplers 37 such as shown in FIG. 4E.

In an exemplary embodiment, the closure member 30 may comprise one or more grommets 60 for selectively locking the closure member 30 in a closed state. By way of example, a first grommet 60 could be positioned near the first connector portion 47 and a second grommet 60 could be positioned near the second connector portion 48. A locking device 61 such as a padlock or zip tie could be selectively connected between the pair of grommets 60 to selectively lock the first and second portions 35, 36 of the closure member 30 together. The positioning of the grommets 60 may vary in different embodiments so long as the locking device 61 may engage to removably lock the closure member 30 in the closed position.

D. Outer Closure Member

Figure 19:
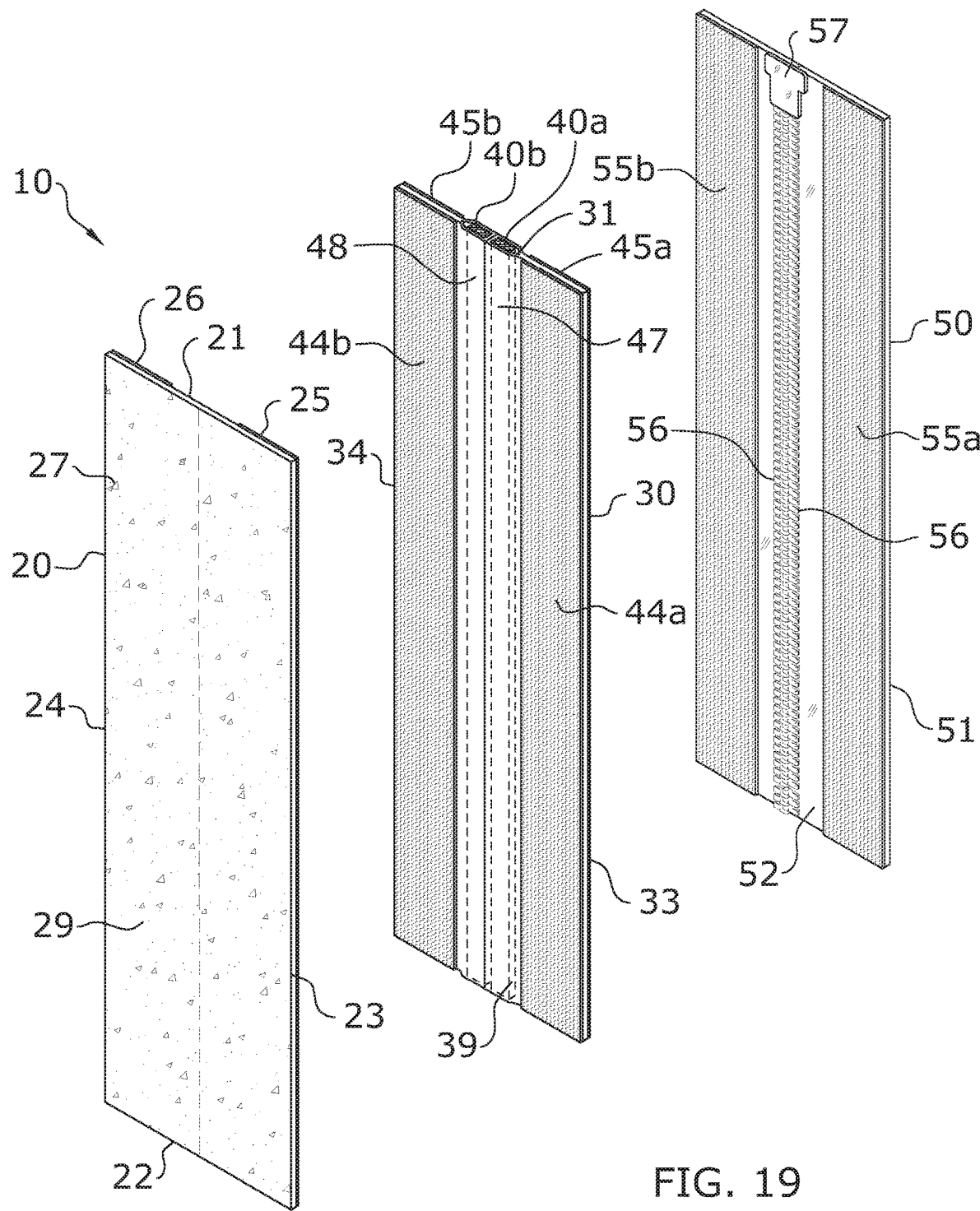
FIG. 19 is a second perspective view of a reusable closure system in accordance with an example embodiment.

As shown in FIGS. 18 and 19, an exemplary embodiment may include an outer closure member 50 which is removably or fixedly connected to the closure member 30. Such an embodiment may be desirable to allow both a magnet-based closure and a zipper-based closure to be used in combination with each other. For example, when the zipper-based closure is open, the magnets may still provide easy access to open and close the barrier. When the zipper-based closure is closed, the barrier will remain closed and, as discussed below, may be locked.

As shown in FIG. 18, the outer closure member 50 may comprise an elongated strip of material which is similar in size and shape to the backing member 20 and closure member 30. The outer closure member 50 may comprise an outer surface 51 and an inner surface 52. The inner surface 52 of the outer closure member 50 may be connected to the closure member 30.

As shown in FIG. 18, the outer closure member 50 may comprise a first portion 53 and a second portion 54, with the first portion 53 being removably connected to the second portion 54. The first and second portions 53, 54 of the outer closure member 50 may be removably connected to each other, such as by the use of a zipper 57 as shown in FIG. 19. It should be appreciated that, in some embodiments, the outer closure member 50 may comprise alternate closure methods, such as the use of fasteners, magnets, or the like.

Continuing to reference FIGS. 18 and 19, it can be seen that the outer closure member 50 may comprise zipper tracks 56, with a first zipper track 56 on the first portion 53 and a second zipper track 56 on the second portion 54 of the outer closure member 50. A zipper 57 may be connected between the zipper tracks 56 so as to selectively close or open the outer closure member 50.

The manner in which the outer closure member 50 is connected to the closure member 30 may vary in different embodiments. In the exemplary embodiment shown in FIG. 19, the inner surface 52 of the outer closure member 50 is illustrated as comprising a pair of connector strips 55a, 55b which extend along the length of the outer closure member 50.

In the exemplary embodiment of the figures, a first connector strip 55a extends along the first portion 53 of the outer closure member 50 and a second connector strip 55b extends along the second portion 54 of the outer closure member 50. The connector strips 55a, 55b may comprise different types of fasteners or adhesives. In the exemplary embodiment shown in the figures, the connector strips 55a, 55b are illustrated as comprising a hook-and-loop fastener material.

In embodiments which utilize an outer closure member 50, the closure member 30 may comprise outer connectors 45a, 45b such as shown in FIGS. 18 and 19. The outer connectors 45a, 45b may be adapted to removably engage with the connector strips 55a, 55b of the outer closure member 50 to secure the outer closure member 50 to the closure member 30.

As shown, the first outer connector 45a may be positioned on the outer surface 38 of the first portion 35 of the closure member 30 and a second outer connector 45b may be positioned on the outer surface 38 of the second portion 36 of the closure member 30. Thus, the first outer connector 45a of the closure member 30 may removably engage with the first connector strip 55a of the outer closure member 50 and the second outer connector 45b of the closure member 30 may removably engage with the second connector strip 55b of the outer closure member 30.

Figure 17A:
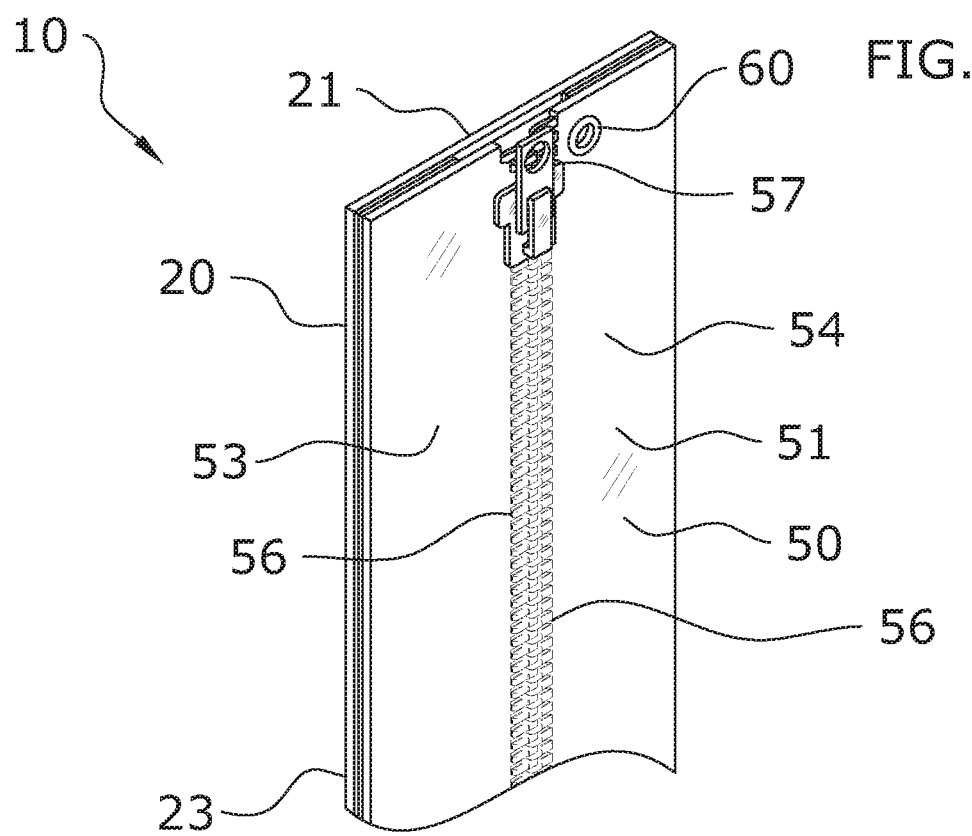
FIG. 17A is a perspective view of a reusable closure system utilizing a grommet in accordance with an example embodiment.
Figure 17B:
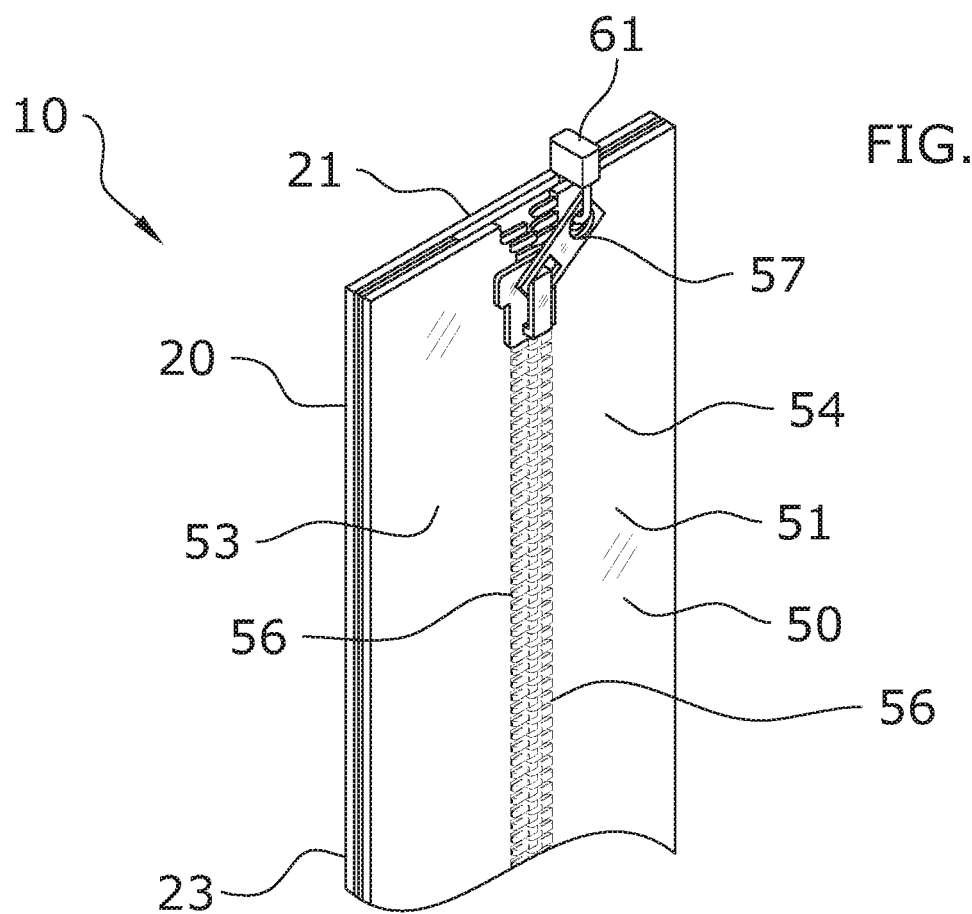
FIG. 17B is a perspective view of a reusable closure system in which a locking device is secured between a grommet and a zipper in accordance with an example embodiment.

As shown in FIGS. 17A and 17B, the outer closure member 50 may be lockable in some embodiments. An opening such as a grommet 60 may be positioned on the outer closure member 50 near the zipper tracks 56. The grommet 60 may be positioned on either the first or second portion 53, 54 of the outer closure member 50. Further, the positioning of the grommet 60 may vary in different embodiments. It could be positioned at or near the top of the outer closure member 50 or at or near the bottom of the outer closure member 50 depending on which way the zipper 57 moves to open and close the outer closure member 50.

As can be seen in FIG. 17B, the outer closure member 50 may be selectively locked by inserting a locking device 61 such as a padlock or the like between the grommet 60 and the zipper 57. When the locking device 61 is in place, the zipper 57 will not be able to move to unzip the outer closure member 50. Only after the locking device 61 has been removed may the zipper 57 function to open or close the outer closure member 50. This may be utilized to prevent access to a location.

As can be shown in FIGS. 5A, 5B, 5D, and 5E, the outer closure member 50 may be easily rolled up to allow for a compact state for storage or transport. The outer closure member 50 may comprise one or more couplers 62 on its outer surface 38 comprised of a fastener or adhesive material, such as hook-and-loop fasteners. The couplers 62 may removably engage with the connector strips 55a, 55b to secure the outer closure member 50 in a rolled-up configuration such as shown in FIGS. 5A, 5B, 5D, and 5E.

The outer closure member 50 may also in some embodiments comprise a label 68 at its upper or lower end. The label 68 may extend off the outer closure member 50 such as shown in FIGS. 5B and 5C. The label 68 may include indicia 69 such as writing, or may be blank to allow a user to write directly on the label 68. In some embodiments, the label 68 may be comprised of a reflective material or the like. The label 68 may be used for identifying the outer closure member 50 or to provide messages such as warnings or the like.

E. Operation of Preferred Embodiment

The systems and methods described herein may be utilized to provide a reusable closure system 10 for use in a wide variety of applications. For example, the reusable closure system 10 could be utilized to create a door in a tent. Alternatively, as described below, the reusable closure system 10 could be used to create a temporary barrier in a door frame 12. Further examples, without limitation, include usage with a truck tarp, clothing, boat covers, backpacks, purses and other bags, shoes, tents, greenhouses, and the like. Any structure or device which is needed to be opened and closed may benefit from the systems and methods described herein.

The reusable closure system 10 may be used in connection with a number of industries and applications, such as but not limited to water damage, transportation, sanding, flooring, painting, safety compliance, restoration, renovations, remodeling, remediation, property management, painting, mold, manufacturing, hospitality, home improvement, healthcare, government, fire damage, facility management, dust barrier, drywall, DIY projects, demolition, containment, concrete cutting, abatement, and the like.

In use, the backing member 20 is first secured to an object, such as by use of the adhesive 27 on the inner surface 29 of the backing member 20. The closure member 30 may then be secured to the backing member 20, such as by engaging the inner connectors 44a, 44b on the inner surface 39 of the closure member 30 with the connectors 25, 26 on the outer surface 28 of the backing member 20.

Once the backing member 20 is secured to the object and the closure member 30 is secured to the backing member 20, the backing member 20 and closure member 30 may be cut if necessary. The closure member 30 may be opened by separating its first and second portions 35, 36 which will also separate the backing member 20. The closure member 30 may be closed by drawing the first and second portions 35, 36 back together (in some embodiments, one will need only to release the closure member 30 and it will naturally return to its closed state). The magnets 40a, 40b or other fasteners will removably secure the closure member 30 in its closed state.

In some embodiments, an outer closure member 50 may be secured to the closure member 30. This will allow an additional level of security to keep the closure member 30 closed. The outer closure member 50 may comprise a zipper 57. When the zipper 57 is opened, the closure member 30 may be freely opened or closed. When the zipper 57 is closed, the closure member 30 will not separate until the zipper 57 is opened. A locking device 61 may be connected between a grommet 60 on the outer closure member 50 and the zipper 57 to lock the outer closure member 50 in a closed position such as shown in FIG. 17B.

Figure 7:
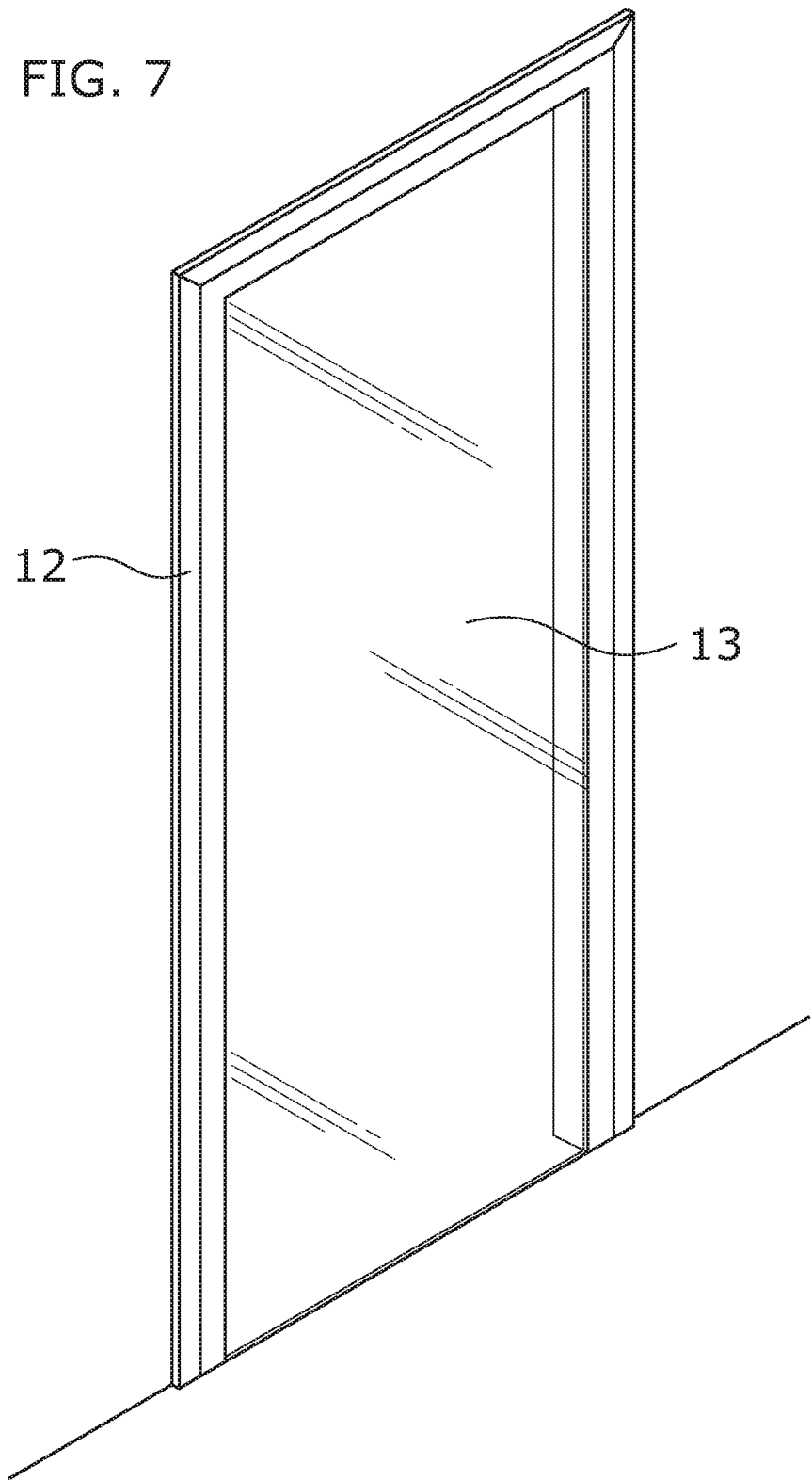
FIG. 7 is a perspective view of a sheet covering a door frame of a reusable closure system in accordance with an example embodiment.

FIGS. 7-11 illustrate an exemplary method of creating a temporary barrier such as a doorway within a door frame 12. A sheet 13 may first be secured over the door frame 12 such as shown in FIG. 7. The sheet 13 may be secured in any number of manners, such as by using tape or the like.

Figure 8:
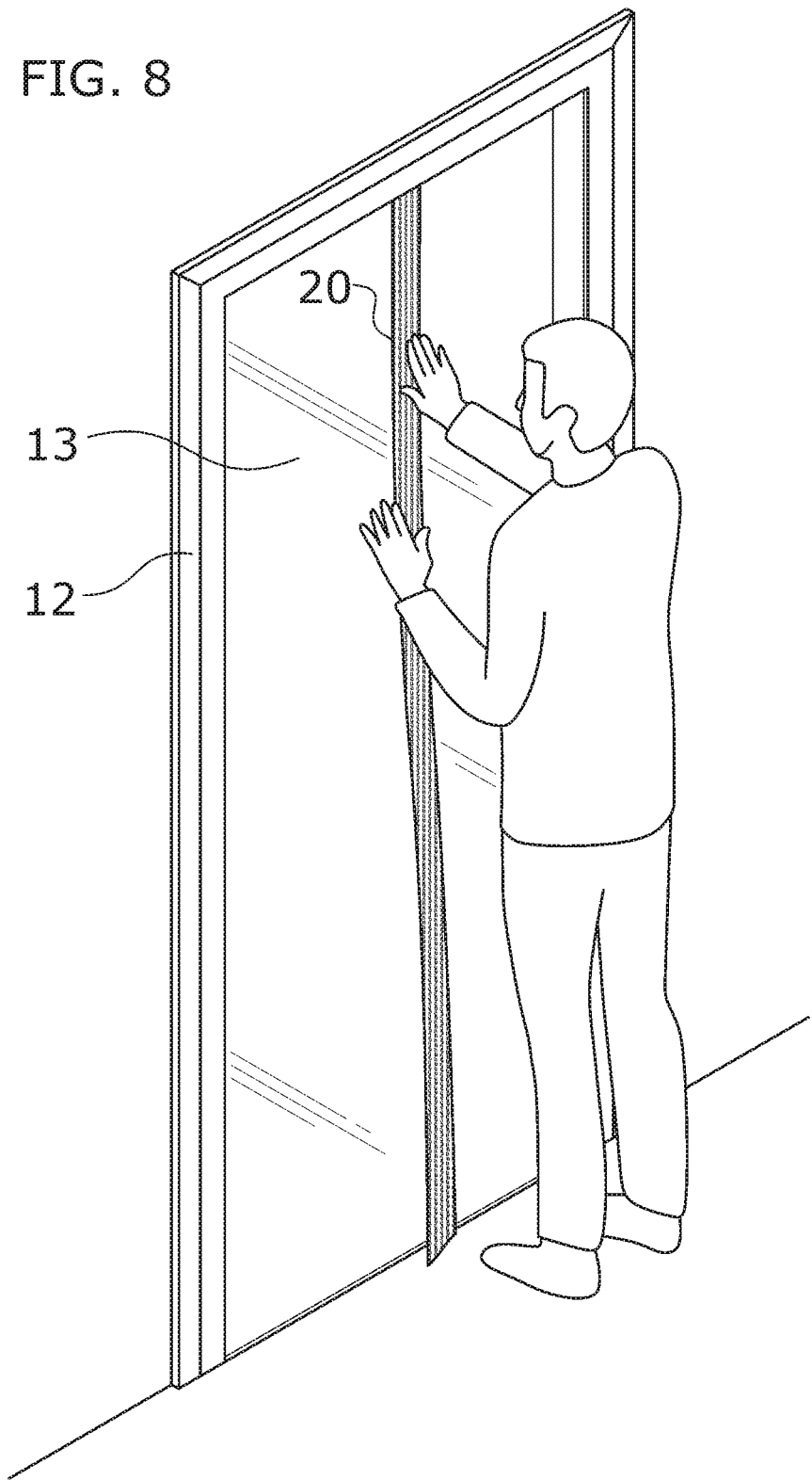
FIG. 8 is a perspective view of a backing member being connected to a sheet of a reusable closure system in accordance with an example embodiment.

With the sheet 13 in place such as shown in FIG. 7, the backing member 20 may be secured to the sheet 13. FIG. 8 illustrates a backing member 20 being secured along the mid-line of the sheet 13. The backing member 20 may be secured via the adhesive 27 on its inner surface 29, with the adhesive 27 adhering against the sheet 13 as shown in FIG. 8.

Figure 9:
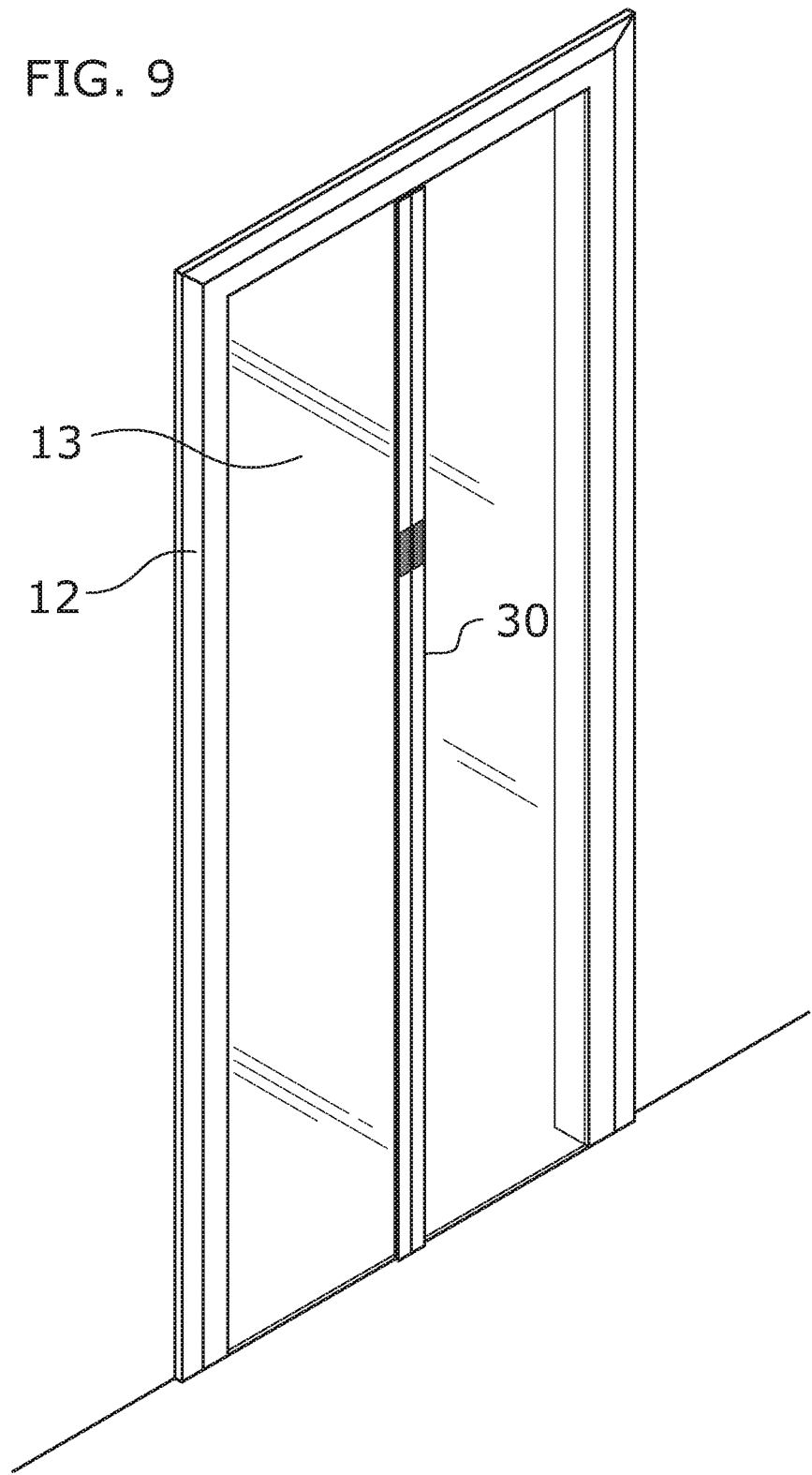
FIG. 9 is a perspective view of a closure member secured to a backing member of a reusable closure system in accordance with an example embodiment.

With the backing member 20 in place on the sheet 13, the closure member 30 may be secured to the backing member 20. FIG. 9 illustrates a closure member 30 secured to a backing member 20. The closure member 30 will generally include inner connectors 44a, 44b which engage with corresponding connectors 25, 26 on the outer surface 28 of the backing member 20 to removably secure the closure member 20 to the backing member 20.

Figure 10:
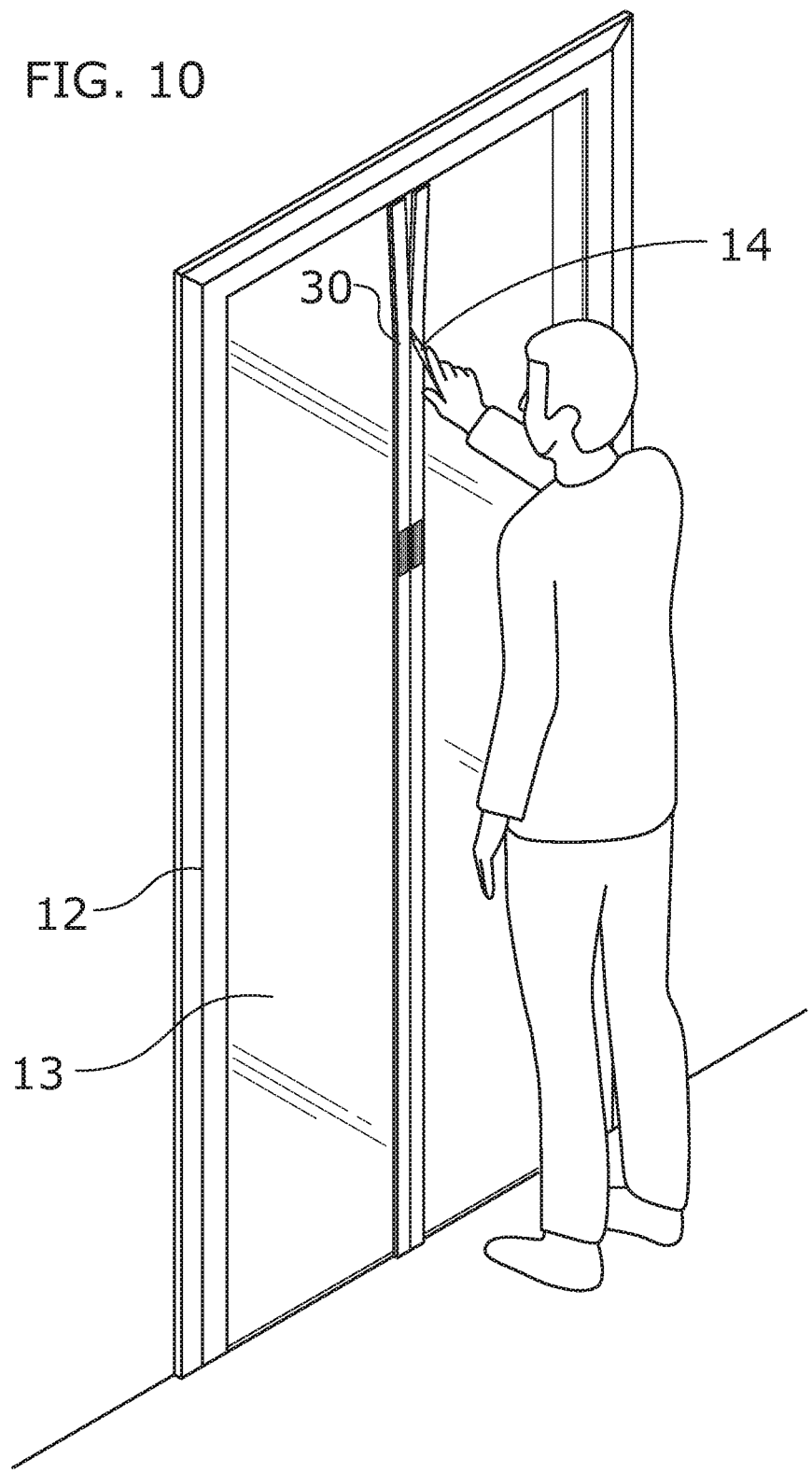
FIG. 10 is a perspective view illustrating cutting of a closure member of a reusable closure system in accordance with an example embodiment.

With the closure member 30 secured to the backing member 20, a user may utilize a cutting tool 14 such as a knife to cut down the centerline of the sheet 13 so as to separate the backing member 20 and the closure member 30 as shown in FIG. 10. In some embodiments, the sheet 13 may be pre-cut. The centerline 19 of the backing member 20 may be used as a guide for cutting.

Figure 11:
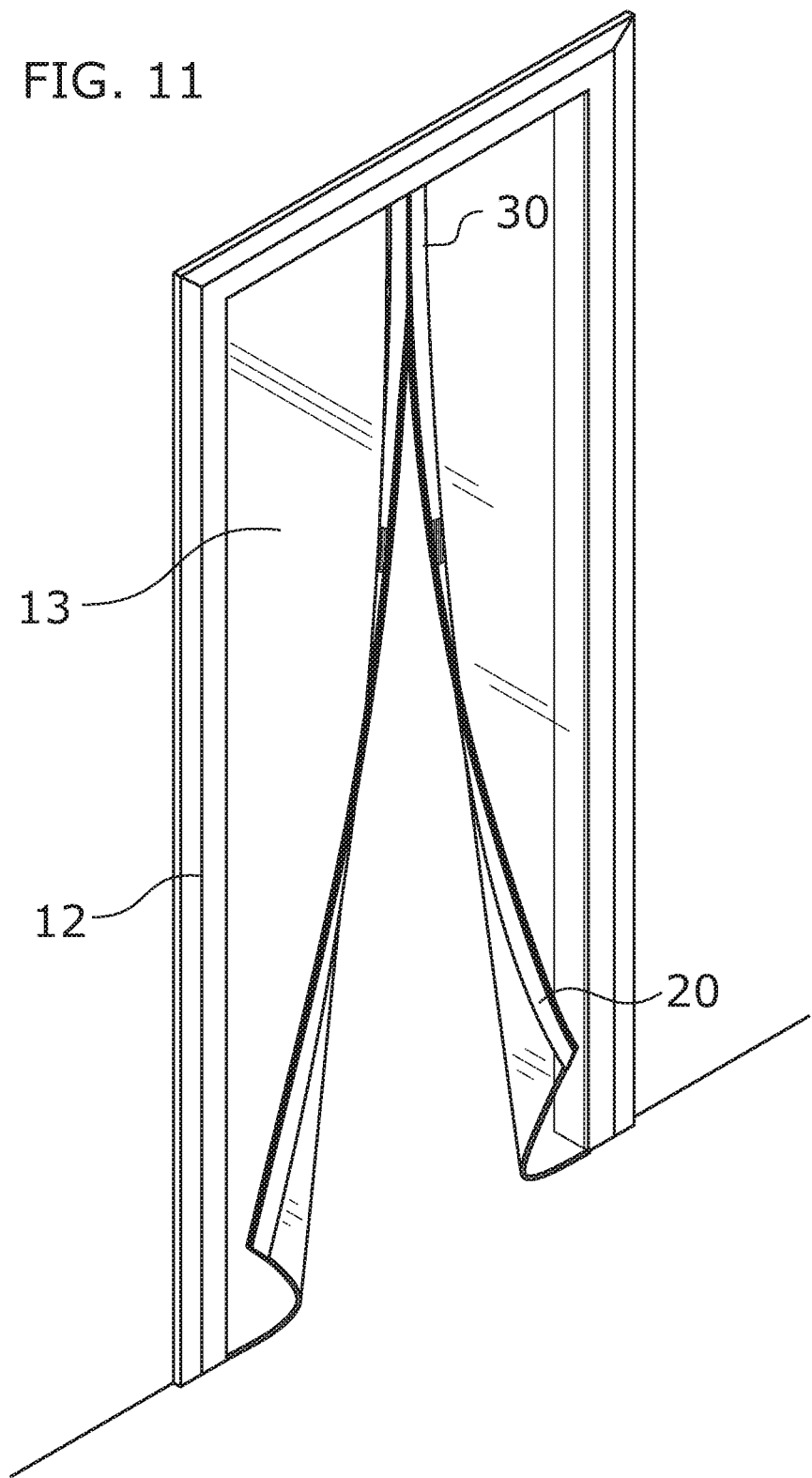
FIG. 11 is a perspective view of a reusable closure system in accordance with an example embodiment.
Figure 12:
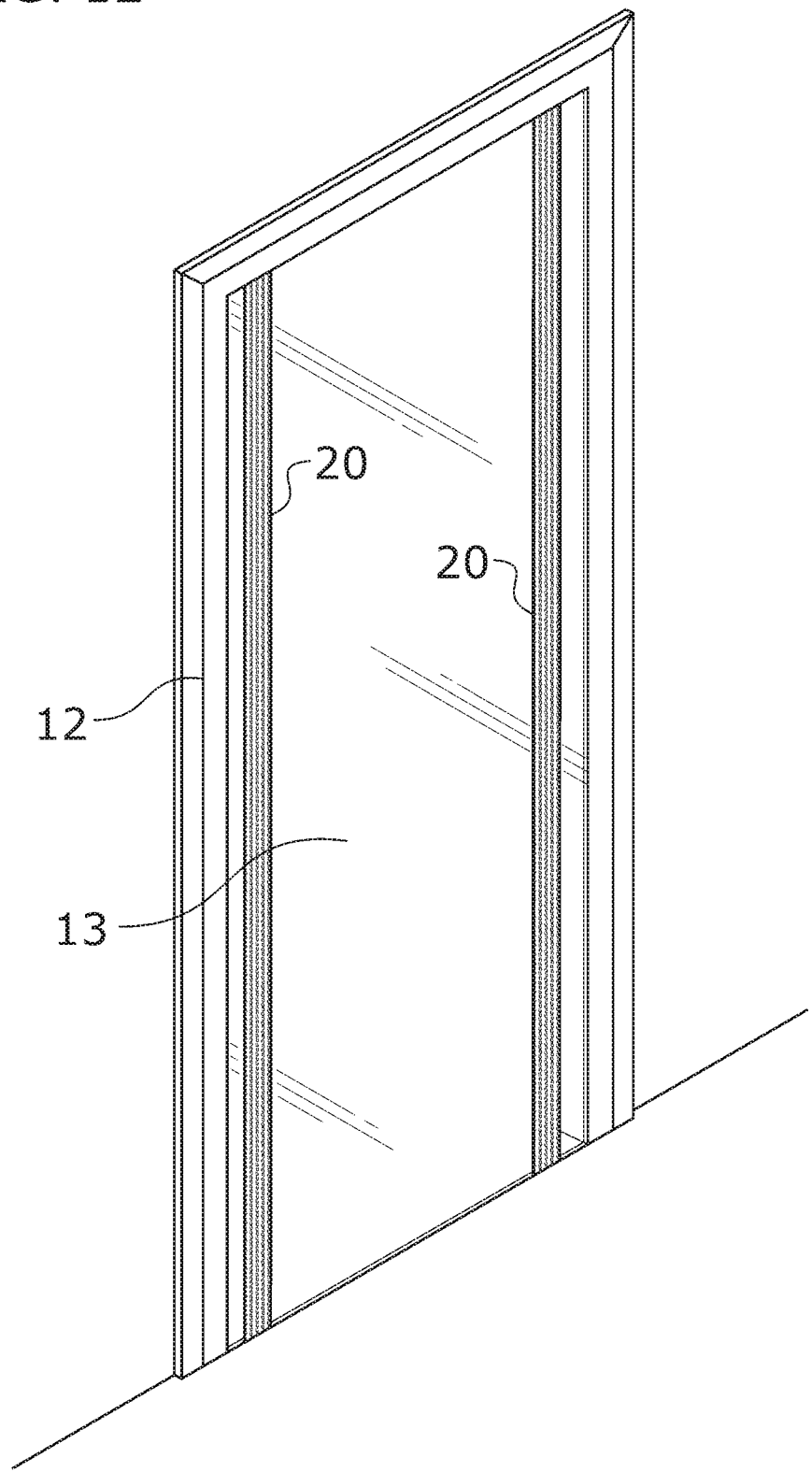
FIG. 12 is a perspective view of an alternate embodiment using two backing members of a reusable closure system in accordance with an example embodiment.

Once the sheet 13, backing member 20, and closure member 30 have been cut, the reusable closure system 10 is ready for use. The sheet 13 may be opened by spreading it apart such as shown in FIG. 11. When closed, such as by letting go of the sheet 13, the magnets 40a, 40b will engage with each other to close the closure member 30 and interconnected backing member 20. In this manner, a doorway may be easily created, such as in a construction area.

Figure 13:
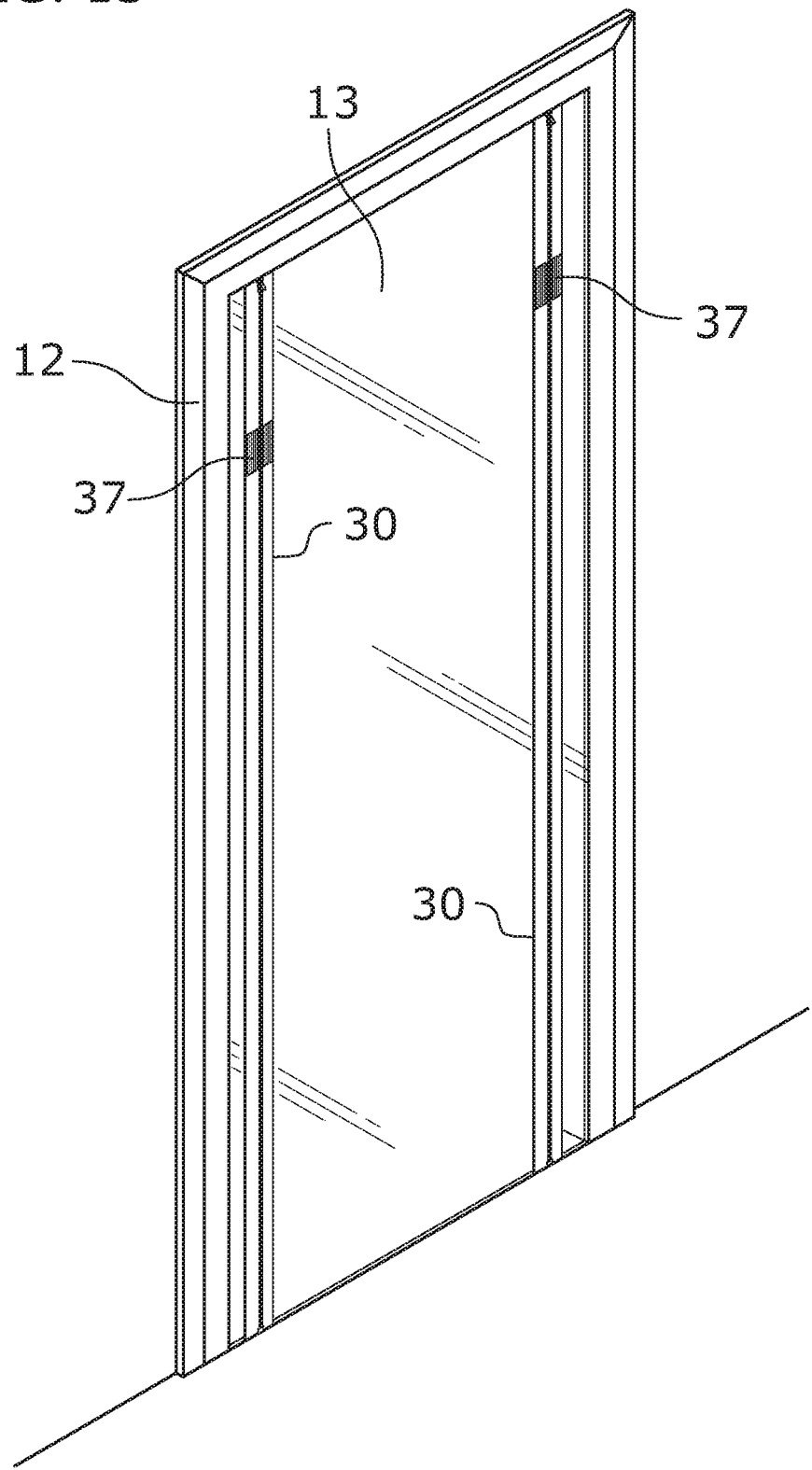
FIG. 13 is a perspective view of a pair closure member connected to the pair of backing members of a reusable closure system in accordance with an example embodiment.
Figure 15:
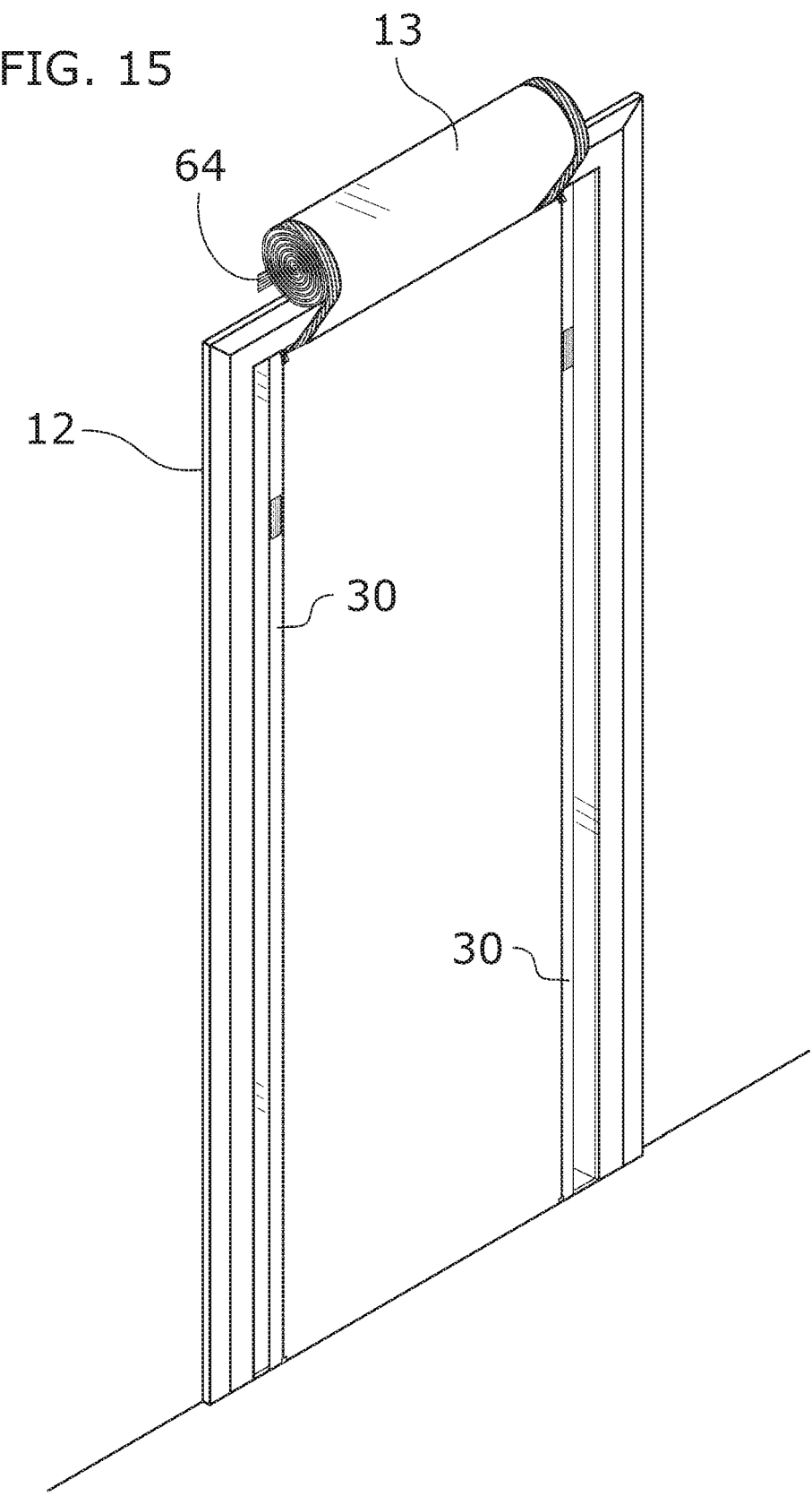
FIG. 15 is a perspective view of a barrier secured above a door frame of a reusable closure system in accordance with an example embodiment.
Figure 16:
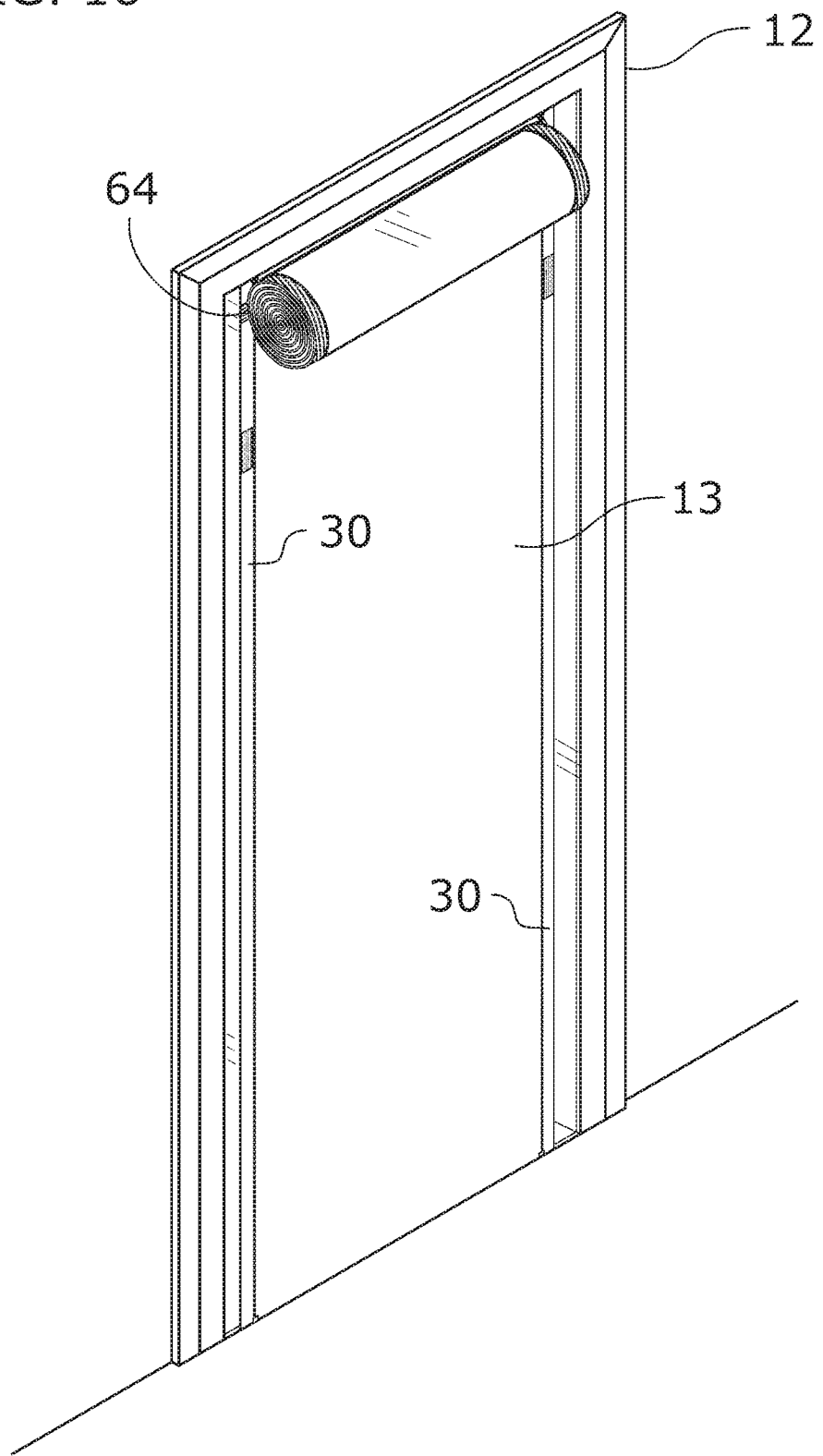
FIG. 16 is a perspective view of a barrier secured below a door frame of a reusable closure system in accordance with an example embodiment.

FIGS. 12-16 illustrate an alternate embodiment in which a pair of backing members 20 are positioned on opposite sides of the sheet 13. A pair of closure members 30 may be secured to the backing members 20 such as shown in FIG. 13. With this embodiment, the sheet 13 may be rolled up such as shown in FIG. 14. The mounts 64 may be secured above the door frame 12 such as shown in FIG. 15 to secure the rolled-up sheet 13 above the door frame 12. Alternatively, the mounts 64 may be secured to the sheet 13 beneath the door frame 12 for an alternate anchoring point for the rolled up sheet 13 such as shown in FIG. 16.

Unless otherwise defined, all technical and scientific terms used herein have the same meaning as commonly understood by one of ordinary skill in the art to which this invention belongs. Although methods and materials similar to or equivalent to those described herein can be used in the practice or testing of the reusable closure system, suitable methods and materials are described above. All publications, patent applications, patents, and other references mentioned herein are incorporated by reference in their entirety to the extent allowed by applicable law and regulations. The reusable closure system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A reusable closure system, comprising:
   a backing member adapted to be secured to an object;
   a closure member removably connected to the backing member, the closure member comprising a first portion and a second portion; wherein the closure member comprises an elongated strip, wherein the first portion comprises a first inner connector along a first edge of the first portion, wherein the second portion comprises a second inner connector along a first edge of the second portion;
   a first magnet connected to the first portion along a second edge of the first portion;
   a second magnet connected to the second portion along a second edge of the second portion, wherein the first magnet is removably connected to the second magnet so as to removably connect the first portion of the closure member to the second portion of the closure member;
   the first and second inner connectors for removably connecting to the backing member; and
   an adhesive on an inner surface of the hacking member for securing the hack ng member to the object.

2. The reusable closure system of claim 1, wherein the first portion of the closure member comprises a first pocket and the second portion of the closure member comprises a second pocket, wherein the first magnet is positioned within the first pocket and the second magnet is positioned within the second pocket.

3. The reusable closure system of claim 1, comprising an outer closure member connected to the closure member.

4. The reusable closure system of claim 3, wherein the outer closure member comprises a zipper.

5. The reusable closure system of claim 4, wherein an outer surface of the closure member comprises a first connector for engaging with an inner surface of the outer closure member.

6. The reusable closure system of claim 5, wherein an inner surface of the outer closure member comprises a second connector for engaging with the first connector of the outer surface of the closure member.

7. The reusable closure system of claim 4, wherein the outer closure member comprises an opening.

8. A reusable closure system, comprising:
   a backing member adapted to be secured to an object;
   a closure member removably connected to the backing member, the closure member comprising a first portion and a second portion; wherein the closure member comprises an elongated strip, wherein the first portion comprises a first inner connector along a first edge of the first portion, wherein the second portion comprises a second inner connector along a first edge of the second portion;
   the first and second inner connectors for removably connecting to the backing member;
   a first magnet connected to the first portion along a second edge of the first portion of the closure member; and
   a second magnet connected to the second portion along a second edge of the second portion of the closure member, wherein the first portion of the closure member is removably connected to the second portion of the closure member by the first magnet and the second magnet, wherein the first magnet and the second magnet are each segmented such that the closure member may be folded into a collapsed state.

9. The reusable closure system of claim 8, comprising an adhesive on an inner surface of the backing member for securing the backing member to the object.

10. The reusable closure system of claim 8, wherein the first portion of the closure member comprises a first pocket, wherein the first magnet is positioned within the first pocket of the first portion of the closure member.

11. The reusable closure system of claim 10, wherein the second portion of the closure member comprises a second pocket, wherein the second magnet is positioned within the second pocket of the second portion of the closure member.

12. The reusable closure system of claim 8, comprising an outer closure member connected to the closure member.

13. The reusable closure system of claim 12, wherein the outer closure member comprises a first portion and a second portion, wherein the first portion of the outer closure member is removably connected to the second portion of the outer closure member.

14. The reusable closure system of claim 13, comprising a zipper connecting the first portion of the outer closure member to the second portion of the outer closure member.

* * * * *

UNITED STATES PATENT AND TRADEMARK OFFICE
CERTIFICATE OF CORRECTION

PATENT NO. : 10,905,203 B2
APPLICATION NO. : 16/296721
DATED : February 2, 2021
INVENTOR(S) : Eric Edgar Burkhart-Day et al.

Page 1 of 1

It is certified that error appears in the above-identified patent and that said Letters Patent is hereby corrected as shown below:

In the Claims

Column 11, Line 49: Please correct "hacking member" to --backing member--.

Column 11, Line 50: Please correct "hack ng member" to --backing member--.

Signed and Sealed this
Twenty-seventh Day of August, 2024

Katherine Kelly Vidal
*Director of the United States Patent and Trademark Office*